US012614658B2

(12) United States Patent  (10) Patent No.:  US 12,614,658 B2
Elbracht et al.  (45) Date of Patent:  Apr. 28, 2026

(54) ELECTRICAL LINE, A COIL AND AN INDUCTIVE POWER TRANSFER DEVICE

(71) Applicant: UNIVERSITAET STUTTGART, Stuttgart (DE)

(72) Inventors: Lukas Elbracht, Stuttgart (DE); Jannis Noeren, Loechgau (DE)

(73) Assignee: Universitaet Stuttgart, Stuttgart (DE)

( * ) Notice: Subject to any disclaimer, the term of this patent is extended or adjusted under 35 U.S.C. 154(b) by 0 days.

(21) Appl. No.: 18/895,881

(22) Filed: Sep. 25, 2024

(65) Prior Publication Data

US 2025/0111984 A1    Apr. 3, 2025

(30) Foreign Application Priority Data

Sep. 28, 2023    (DE) ..................... 10 2023 126 454.0

(51) Int. Cl.
*H01F 27/28*    (2006.01)
*H02J 50/10*    (2016.01)

(52) U.S. Cl.
CPC .......... *H01F 27/2804* (2013.01); *H02J 50/10* (2016.02); *H01F 2027/2809* (2013.01)

(58) Field of Classification Search
CPC ......... H01F 27/2804; H01F 2027/2809; H01F 38/18; H01F 27/34; H01F 38/14; H01F 5/003; H02J 50/10
See application file for complete search history.

(56) References Cited

U.S. PATENT DOCUMENTS 5,414,400 A * 5/1995 Gris ..................... G01R 15/181
                                                        336/200
7,741,943 B2 * 6/2010 Fouquet .............. H01F 27/2804
                                                        336/200

(Continued)

FOREIGN PATENT DOCUMENTS

DE          19824113 A1    12/1999
DE      102021112455 A1    11/2022

(Continued)

OTHER PUBLICATIONS

European Search Report for corresponding European Patent Application No. 24201984.2, mailed Feb. 14, 2025.

(Continued)

*Primary Examiner* — Rexford N Barnie
*Assistant Examiner* — Michael J Warmflash
(74) *Attorney, Agent, or Firm* — Jason H. Vick; Amped IP LLC

(57)          ABSTRACT

The present disclosure relates to an electrical line, a coil and an inductive power transfer device. The electrical line comprises a conductor carrier having at least two substantially parallel carrier layers and a plurality of circuit traces arranged on at least three different, substantially parallel carrier surfaces of the carrier layers. A single circuit trace of the plurality of circuit traces has at least three circuit track sections arranged on at least three different carrier surfaces. Two respective circuit trace sections of a circuit trace are connected to one another by a vertical connection extending transversely to the carrier surfaces and through at least one carrier layer. A plurality of circuit trace sections of different circuit traces is arranged on a carrier surface, which run parallel to one another at least in some areas and which run along a longitudinal extension direction at least in some areas. A circuit trace section arranged on a carrier surface has a plurality of section elements, wherein two respective (Continued)

section elements following one another in the longitudinal extension direction are arranged offset relative to one another both in the longitudinal extension direction and in the transverse direction extending perpendicularly thereto and are connected to one another by a transverse connecting element.

18 Claims, 17 Drawing Sheets

(56) References Cited

U.S. PATENT DOCUMENTS

| | | | | |
|---|---|---|---|---|
| 9,917,479 | B2 * | 3/2018 | Bronson | H02J 50/70 |
| 10,432,152 | B2 * | 10/2019 | Watts | H01F 27/2804 |
| 11,870,307 | B2 | 1/2024 | Maier et al. | |
| 2002/0095776 | A1 * | 7/2002 | Ahn | H01F 27/2804 |
| | | | | 257/E27.046 |
| 2009/0085706 | A1 * | 4/2009 | Baarman | H01F 5/003 |
| | | | | 336/200 |
| 2013/0181535 | A1 * | 7/2013 | Muratov | H01F 27/363 |
| | | | | 307/104 |
| 2013/0300353 | A1 * | 11/2013 | Kurs | H02J 50/90 |
| | | | | 336/200 |
| 2013/0308256 | A1 * | 11/2013 | Lehr | H01F 5/003 |
| | | | | 361/679.01 |
| 2014/0175898 | A1 * | 6/2014 | Kurs | H02J 7/00034 |
| | | | | 336/200 |
| 2015/0270058 | A1 * | 9/2015 | Golko | H01F 27/36 |
| | | | | 307/104 |
| 2015/0340153 | A1 * | 11/2015 | Lohr | H01F 38/14 |
| | | | | 336/200 |
| 2018/0309323 | A1 * | 10/2018 | Klingspor | H04B 5/79 |
| 2020/0105457 | A1 * | 4/2020 | Yasuda | H01F 27/29 |
| 2020/0168393 | A1 * | 5/2020 | Long | H01F 27/402 |
| 2021/0184500 | A1 * | 6/2021 | Shi | H01F 5/003 |
| 2022/0068549 | A1 * | 3/2022 | Yoshioka | H01F 17/0006 |
| 2022/0139615 | A1 * | 5/2022 | Yang | H01F 38/14 |
| | | | | 307/104 |
| 2023/0067293 | A1 * | 3/2023 | Liu | B60L 53/12 |

FOREIGN PATENT DOCUMENTS

| | | | |
|---|---|---|---|
| DE | 102020206998 | B4 | 2/2023 |
| DE | 102020207000 | B4 | 2/2023 |

OTHER PUBLICATIONS

Office Action for corresponding German Patent Application No. 102023126454.0, mailed May 24, 2024.

* cited by examiner

101
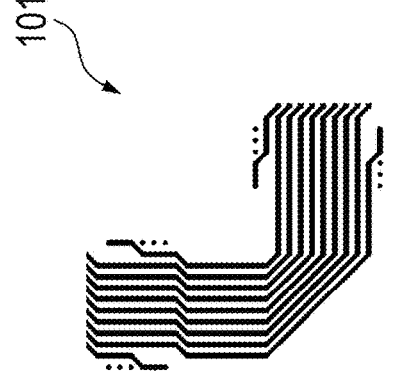
103
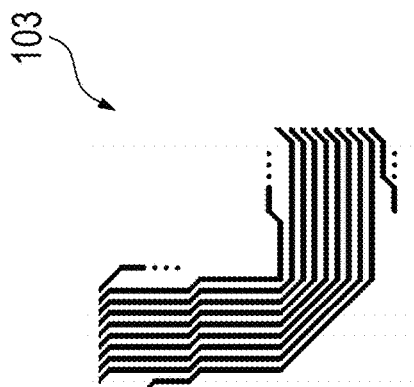
100
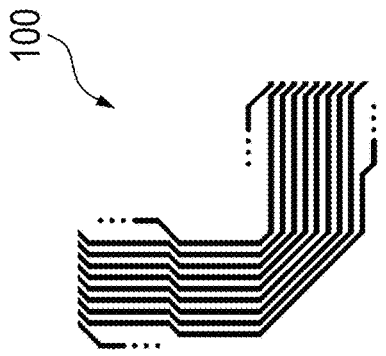
102
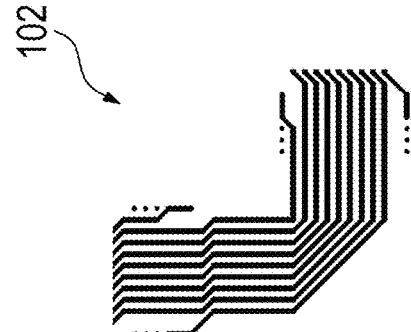
Fig. 6

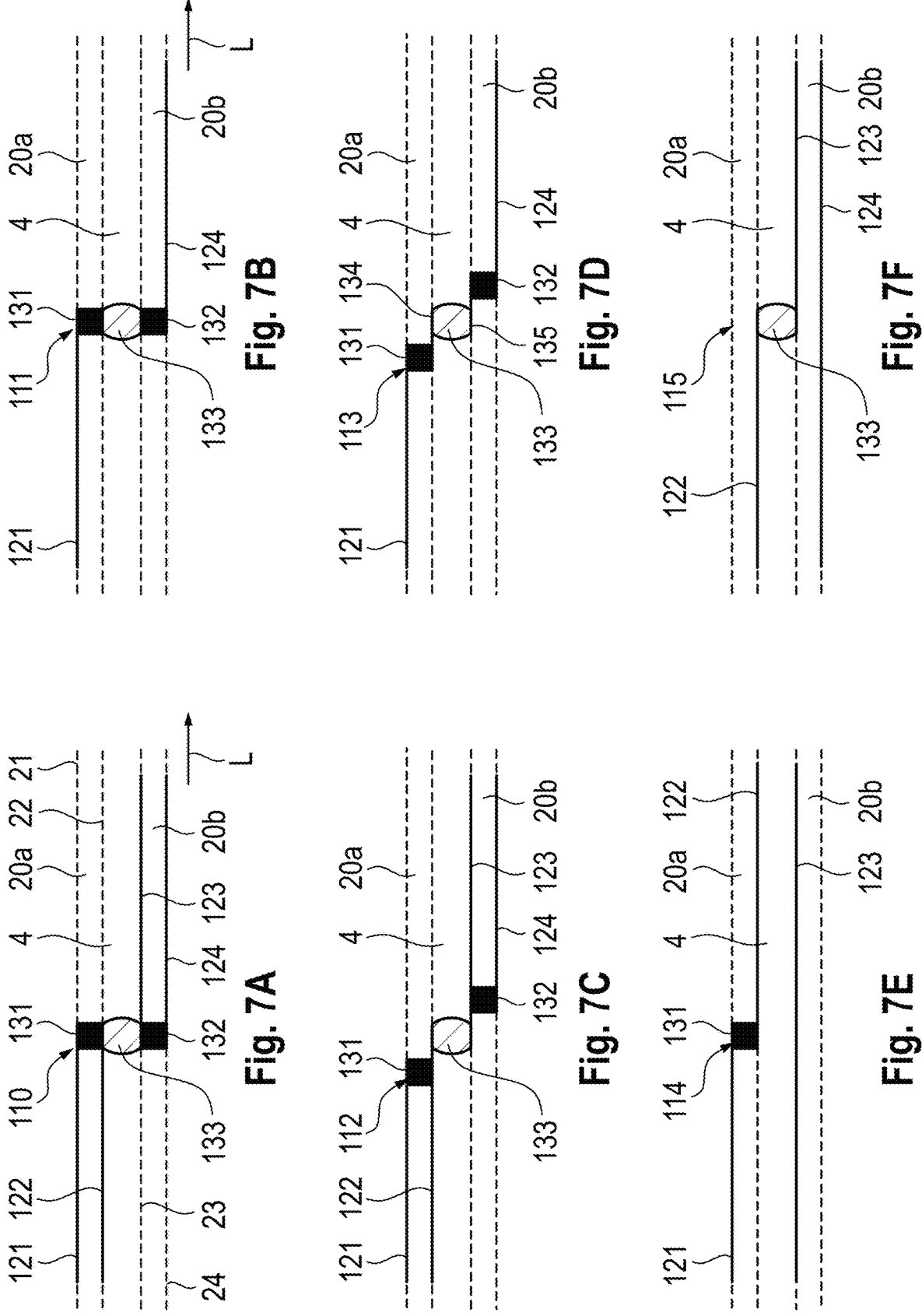

201
202
203
204
205
205
204
203
202
201

200

201
202
203
204
205

200

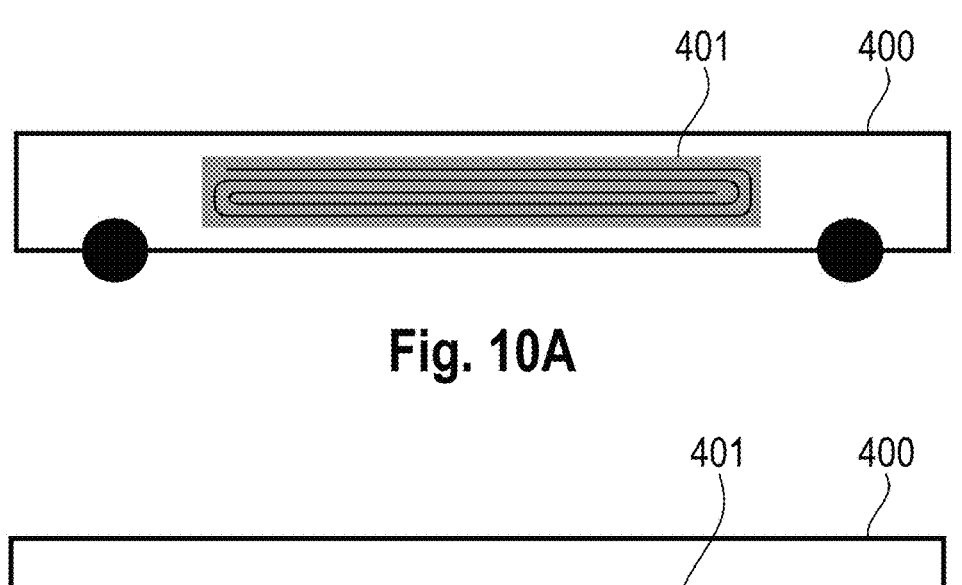
Fig. 10A
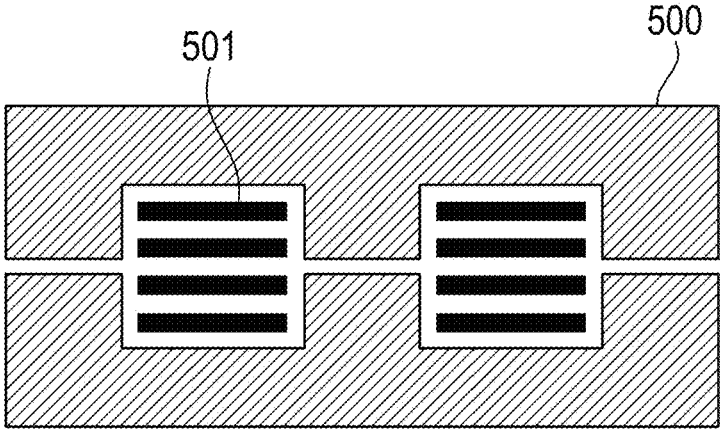
Fig. 10B
Fig. 11

ELECTRICAL LINE, A COIL AND AN INDUCTIVE POWER TRANSFER DEVICE

CROSS-REFERENCE TO RELATED APPLICATIONS

This application claims the benefit under 35 U.S.C. 119(a) to German Patent Application No. 10 2023 126 454.0, filed Sep. 28, 2023, the disclosure of which is incorporated herein by reference in its entirety.

BACKGROUND

The present disclosure relates to an electrical line, a coil and an inductive power transfer device. Further, the present disclosure relates to an electrical device having such a coil and/or such an inductive power transfer device.

An electrical line is a linear electrical conductor for transporting electrical energy or transmitting signals. Electrical lines usually consist of low-resistance metallic electrical conductors, for example in the form of wires, strands, rails or printed circuit traces. Depending on the application, different requirements may be placed on electrical lines. Common requirements for electrical lines are low electrical resistance, low-loss power or signal transmission, cost-effective production, high current carrying capacity and flexible use.

SUMMARY

The present disclosure is based on the object of providing an electrical line which operates with as little loss as possible in applications in the kHz range and higher frequencies, can be manufactured inexpensively and has a small space requirement. The present disclosure is also based on the object of providing a coil, an inductive power transfer device and an electrical line in which such an electrical line is advantageously used.

According to one aspect of the present disclosure, an electrical line is provided having:

- a conductor carrier having at least two substantially parallel carrier layers; and a plurality of circuit traces arranged on at least three different, substantially parallel carrier surfaces of the carrier layers, wherein:

- a single circuit trace of the plurality of circuit traces has at least three circuit track sections arranged on at least three different carrier surfaces;
- two respective circuit trace sections of a circuit trace are connected to one another by a vertical connection extending transversely to the carrier surfaces and through at least one carrier layer;
- a plurality of circuit trace sections of different circuit traces is arranged on a carrier surface, which run parallel to one another at least in some areas and which run along a longitudinal extension direction at least in some areas; and
- a circuit trace section arranged on a carrier surface has a plurality of section elements, wherein two respective section elements following one another in the longitudinal extension direction are arranged offset relative to one another both in the longitudinal extension direction and in the transverse direction extending perpendicularly thereto and are connected to one another by a transverse connecting element.

According to a further aspect of the present disclosure, a coil is provided having at least one helically arranged winding of an electrical line according to the present disclosure.

According to a still further aspect of the present disclosure, an inductive power transfer device is provided having a primary coil unit and a secondary coil unit, wherein the primary coil unit and/or the secondary coil unit comprises a coil according to the present disclosure.

Furthermore, according to a further aspect of the present disclosure, an electrical device having a coil according to the present disclosure and/or an inductive power transfer device according to the present disclosure is provided. The electrical device is, for example, a mobile device or a ground plate having a coil according to the present disclosure. The mobile device may, for example, be a vehicle to which electrical energy can be transferred without contact in a stationary state or while driving, for example by means of one or more ground plates in which primary coils are integrated. Alternatively, the electrical device may be an electrical machine, for example an inductively electrically excited synchronous machine, having an inductive power transfer device according to the present disclosure. According to a further aspect, the present disclosure also relates to an electrical device having a coil and/or an inductive power transfer device which is realized by means of an electrical line in the form of circuit traces which are mounted on one or more circuit boards and whose course simulates the twisted course of the individual wires of a stranded wire.

Preferred embodiments of the disclosure are defined in the dependent claims. It will be understood that the claimed coil and the claimed inductive power transfer device have similar and/or identical preferred embodiments as the claimed electrical line, in particular as defined in the dependent claims and as disclosed herein.

The disclosure is based on the idea of arranging a plurality of circuit traces on several (at least three, preferably at least four) different carrier surfaces, which in turn are arranged on several carrier layers (for example PCB layers) of a line carrier (for example a PCB carrier), and arranging these offset to one another both within a carrier surface and between carrier surfaces. Several sections ("circuit trace sections") of a circuit trace are thus arranged on different carrier surfaces and are electrically connected to each other by separate vertical connections (e.g. vias). Each section in turn has several parts ("section elements") that run offset to each other within the partial area and are electrically connected to each other by transverse connections. The carrier layers and the carrier surfaces are arranged essentially in parallel, by which it should be understood that deviations from the exact parallelism of up to ±25°, preferably up to ±10°, even more preferably up to a maximum of ±5°, and deviations due to manufacturing tolerances should be included.

The circuit traces are preferably arranged in such a way that they are each approximately of the same length and are interwoven with each other, as in a strand consisting of a large number of individual wires. This means that the current is distributed homogeneously over the entire cross-section. In addition, such an electrical line can be designed to be cost-effective and very space-saving, in particular very flat, which has advantages for various applications. Furthermore, other components that are required or advantageous for an inductive power transfer device, for example, can be easily integrated. Such components, for example for power factor correction, can thus be arranged directly on a coil formed by means of a line according to the disclosure (e.g. on a PCB).

The electrical line according to the disclosure is suitable for various applications, preferably when little space is available, and the focus is on cost-effective production with simultaneous low-loss energy transmission and high current density carrying capacity. Preferably, such an electrical line can be used for coils having one or more windings, such as those used as primary and/or secondary coils in inductive energy transfer systems. There is often only little space available for the arrangement of the coils and production should be possible at low cost. Other areas of application include transformers in very flat designs or integrated transformers on a single circuit board in which two coils are interleaved.

In a preferred embodiment, it is provided that a section element of a circuit trace section is connected to a vertical connection by an end connecting element, the vertical connection being arranged offset in transverse direction with respect to the said section element. The vertical connection—viewed in the longitudinal extension direction—is therefore not in line with the section element but offset transversely to it. Another circuit trace can therefore run on another carrier surface in the same vertical plane as the circuit trace without colliding with the vertical connection.

In this context, it should be mentioned that the term "transverse" in the context of the present disclosure is not to be understood as "extending perpendicularly thereto" but is also intended to include an oblique course having an angle of between 0° and 180°.

In a further embodiment, it is provided that the transverse connecting elements and the end connecting elements are arranged in groups parallel to one another in a carrier surface. The offset of the parallel section elements thus takes place-viewed in the longitudinal extension direction—at essentially the same point for all section elements of all circuit traces on a carrier surface. This allows the circuit traces to be routed close together on a carrier surface without them touching or crossing each other.

In a further embodiment, it is provided that the vertical connections are arranged in at least one vertical connection region which extends in the longitudinal direction and/or substantially parallel to the circuit trace sections. Further, it is provided in an embodiment that the vertical connections are arranged in at least one vertical connection region which is spaced apart from the circuit trace sections and/or in which no section elements of circuit trace sections are arranged. Preferably, no section elements of circuit trace sections are arranged in all vertical connection regions of all carrier surfaces. The vertical connections are thus arranged in one or more vertical connection regions and can therefore extend through one or preferably all carrier layers and their carrier surfaces without colliding with circuit trace sections. This facilitates the production of the vertical connections as well as the connections of circuit trace sections in the desired carrier layers. For example, to create a vertical connection, a hole can first be drilled through all the carrier layers, into which the conductive material is then inserted. This enables particularly cost-effective production of the vertical connections and thus the electrical line.

In an embodiment the distance between a vertical connection region and directly adjacent section elements corresponds at least to the distance between two adjacent section elements. This ensures that the vertical connections do not touch any section elements during production. Furthermore, the fill factor of electrically conductive material (e.g. the so-called copper fill factor when using copper) can be maximized.

Preferably, it is provided that, on at least one carrier surface, the distance between the vertical connection region and directly adjacent section elements is equal to or greater than the distance between two adjacent section elements. This provides greater flexibility with regard to the arrangement of the vertical connections and the end connection elements that electrically connect section elements with vertical connections. These end connection elements can then be arranged—in whole or in part, as required—in the increased spacing area flexibly and having the desired shape without affecting the neighboring section elements, both on the same carrier surface or on other carrier surfaces or requiring a change in their arrangement. In other words, the section elements, the vertical connections and the end connection elements can be arranged in the best possible way—from an electrical point of view and from the point of view of cost-effective and simple manufacture and the smallest possible space requirement.

the vertical connection region may, e.g., comprise two vertical connection subsections which, viewed in the transverse direction, are arranged in opposite end regions outside the central region in which the circuit trace sections extend. The vertical connection sections are therefore preferably arranged in the outer areas of the support surfaces, while the line sections run centrally on the support surfaces. However, other configurations are also conceivable, such as the arrangement of the vertical connections in the central area, from which the line sections extend outwards.

In an embodiment, it is provided that the vertical connections extend through several carrier layers, in particular through all carrier layers. This is particularly possible if the vertical connection regions are arranged at a distance from the line sections and the vertical connections do not collide with the vertical connections. This results in savings during manufacture, as fewer vertical connections are required compared to an embodiment in which vertical connections only connect section elements of line sections on adjacent support surfaces.

In general, the vertical connections can only have a single connecting element. However, they can also have several (preferably parallel) connecting elements and/or be designed as one or more vias or through-contacts. The electrical connection can be ensured by using several connecting elements, e.g. several vias or through-contacts, which are arranged one behind the other in the longitudinal extension direction, for example. This also results in lower electrical resistance and therefore better conductivity and higher efficiency. Furthermore, the individual connecting elements (vias or through-contacts) can be designed with a smaller cross-section and thus save space compared to a single connecting element, which would have a larger diameter. This means that the vertical connection region takes up less space on the carrier surfaces, so that more or thicker circuit traces can be accommodated on the carrier surfaces.

In a preferred implementation, on a first carrier surface, the section elements of a circuit trace section are offset relative to one another in a first direction in the transverse direction, as viewed in the longitudinal extension direction, and in a second carrier surface, the section elements of a circuit trace section are offset relative to one another in a second direction in the transverse direction, as viewed in the longitudinal extension direction, which second direction runs in the opposite direction to the first direction. These two carrier surfaces can be neighboring carrier surfaces or carrier surfaces that are further spaced apart.

Preferably, the electrical line has two or more conductor carriers which are arranged one above the other and whose vertical connections are electrically connected to one another at opposite carrier surfaces of two conductor carriers. Two adjacent conductor carriers are preferably separated from each other by a separating layer, for example a dielectric, substrate, air, etc.

In general, the electrical line according to the disclosure is suitable for a wide frequency range, i.e., it can be used at different frequency ranges. Exemplary applications are in the frequency range from 10 KHz to 1 MHz; however, other applications can also use lower or higher frequency ranges up to the GHz range.

It is understood that the features mentioned above and those to be explained below can be used not only in the combination indicated in each case, but also in other combinations or on their own, without departing from the scope of the present disclosure.

BRIEF DESCRIPTION OF THE DRAWINGS

Exemplary embodiments of the disclosure are shown in the following drawings and are explained in more detail in the following description:

FIG. 6 shows a top view of various embodiments of an electrical line according to the disclosure deflected by 90°;

FIGS. 7A-7F shows cross-sections running in the longitudinal extension direction through various embodiments of an electrical line according to the disclosure having different types of vertical connections;

FIGS. 10A-10B shows a representation of a mobile device having a coil according to the present disclosure in cross-section and as a view from below;

FIG. 11 shows a schematic structure of a PCB inductor according to the present disclosure;

DETAILED DESCRIPTION OF DRAWINGS

Figure 1:
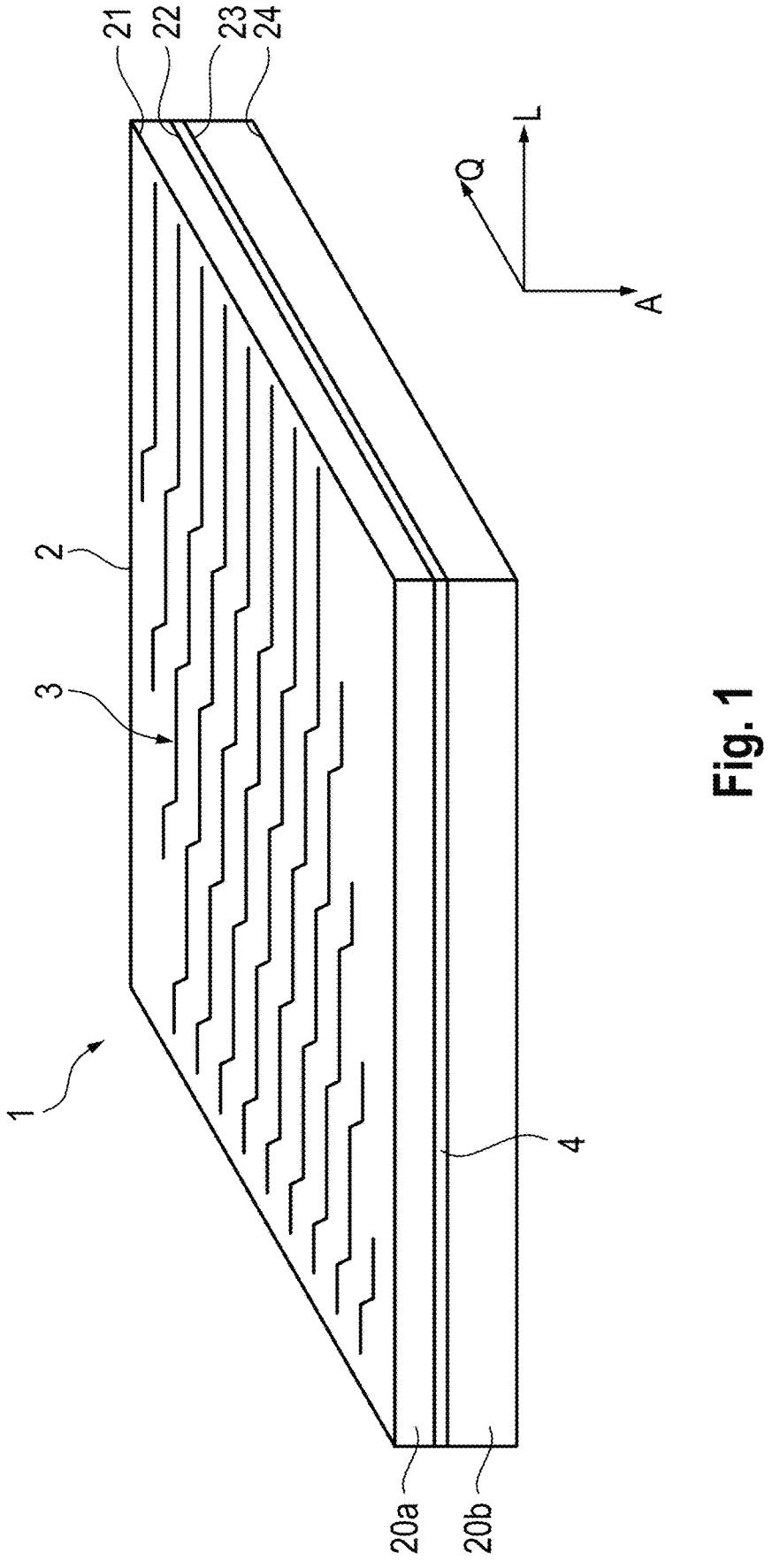
FIG. 1 shows a perspective view of an electrical line according to the disclosure.

FIG. 1 shows a perspective view of an electrical line 1 according to the disclosure. The electrical line 1 has a conductor carrier 2 and a plurality of circuit traces 3. The conductor carrier 2 has at least two (in the present example exactly two) carrier layers 20a, 20b arranged essentially in parallel and can be designed, for example, as a printed circuit board, printed circuit card, circuit board or printed circuit, for example in the form of a PCB (Printed Circuit Board) having several PCB layers as carrier layers 20a, 20b. The plurality of circuit traces 3 are arranged on at least three (in the present example four) different, essentially parallel carrier surfaces 21, 22 23, 24 of the carrier layers.

In the present example, the carrier surfaces 21 and 22 correspond to the two opposite surfaces of the carrier layer 20a and the carrier surfaces 23 and 24 correspond to the two opposite surfaces of the carrier layer 20b. In the present example, nine circuit traces are arranged on each carrier surface 21-24, for example in the form of printed circuit traces made of an electrically conductive material such as copper. A separating layer 4 is preferably arranged between the carrier layers 20a, 20b, for example in the form of a dielectric, an insulating layer, a substrate or an air layer.

The following directions in FIG. 1 are also important for the following explanations: longitudinal extension direction L, transverse direction Q running perpendicular to it and layer direction A running perpendicular to L and Q.

Figures 2A, 2B:
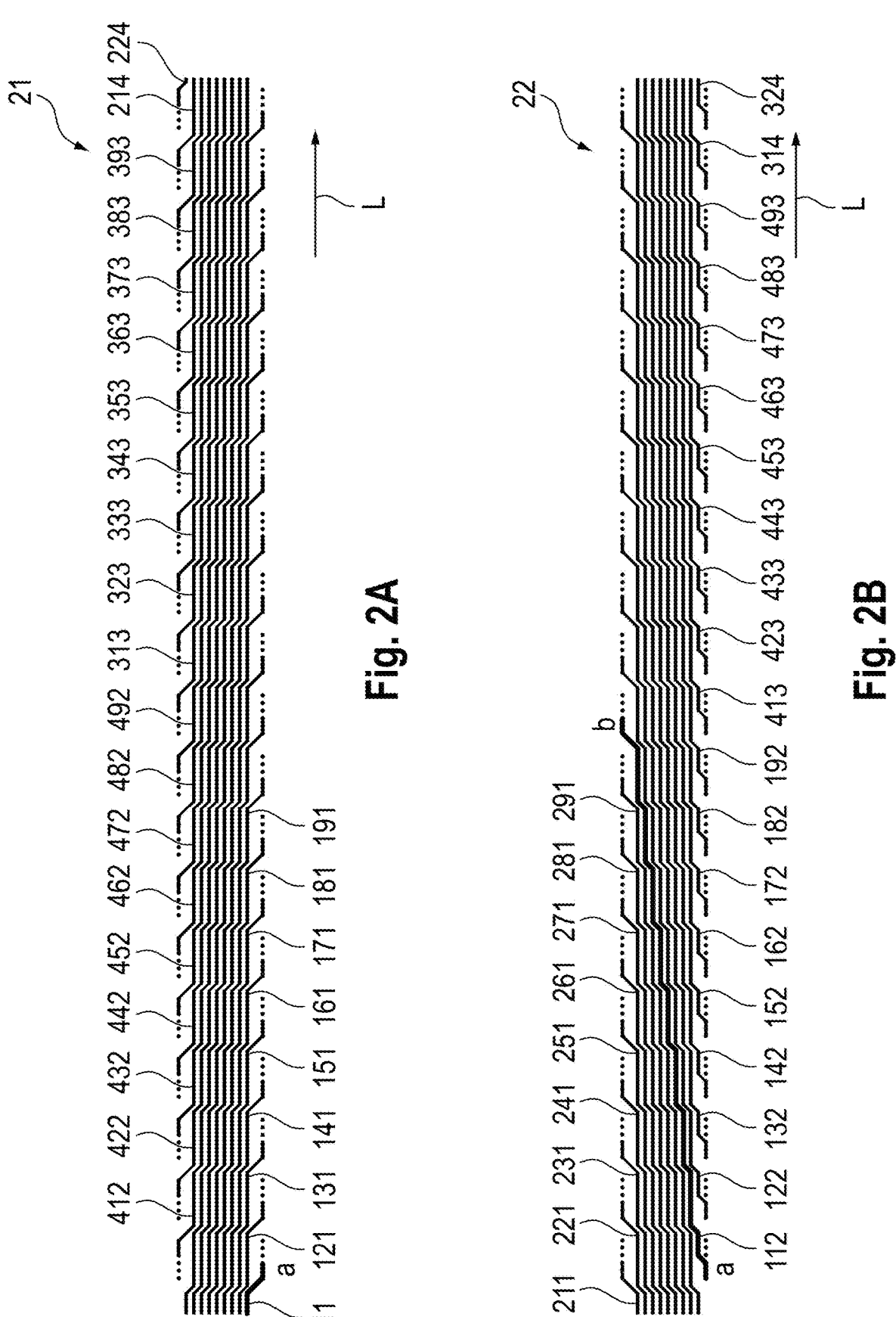
FIGS. 2A-2D shows top views of four different carrier surfaces of an electrical line according to the disclosure.
Figures 2C, 2D:
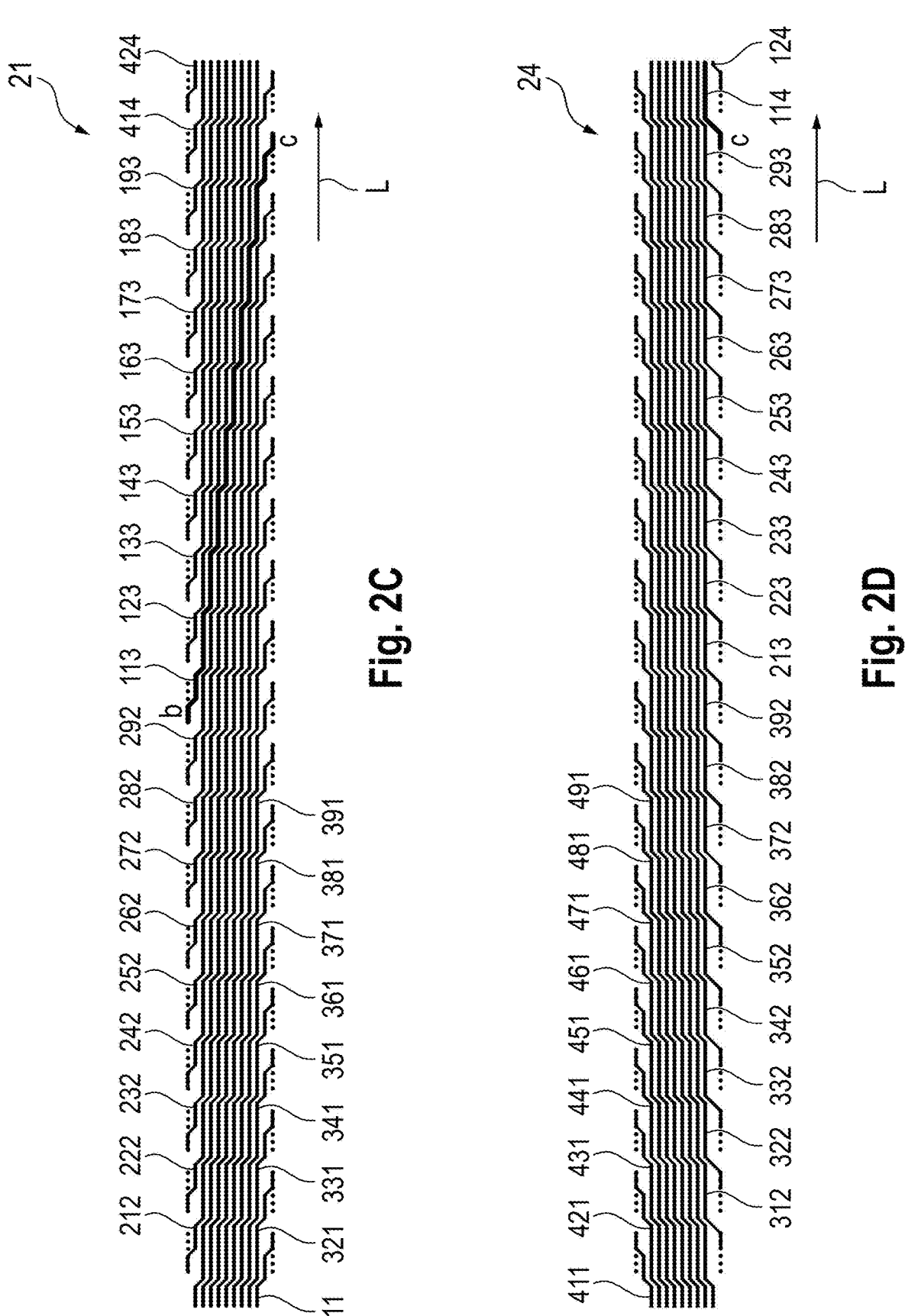
Figures 3A, 3B:
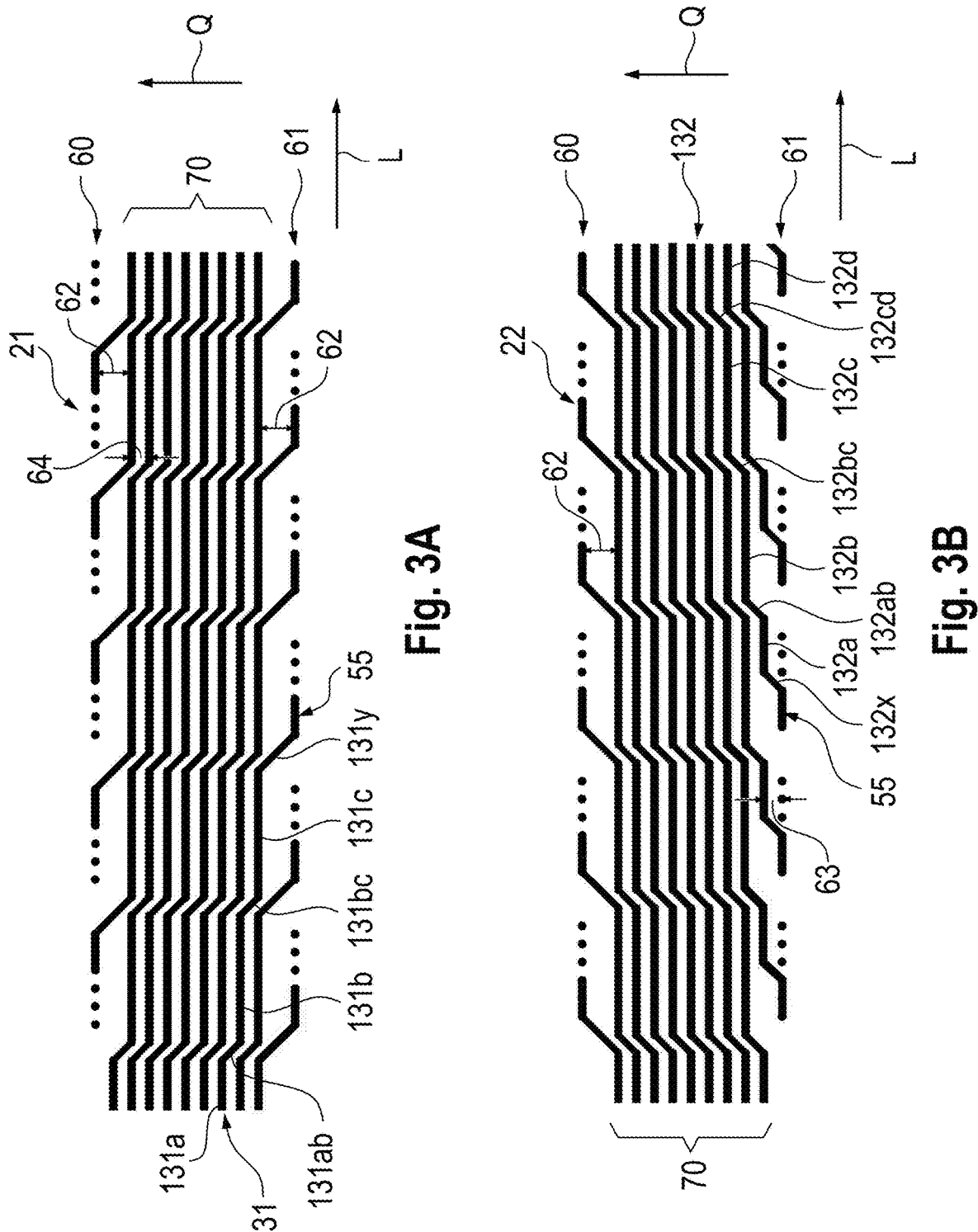
FIGS. 3A-3B shows an enlarged section of first and second carrier surfaces of an electrical line according to the disclosure.

FIG. 2 shows plan views of the arrangement of circuit traces on the four different carrier surfaces 21-24 of an electrical line according to the disclosure. FIG. 2A shows the first carrier surface 21, FIG. 2B shows the second carrier surface 22, FIG. 2C shows the third carrier surface 23 and FIG. 2D shows the fourth carrier surface 25. FIG. 3 shows enlarged sections of the first carrier surface 21 (FIG. 3A) and the second carrier surface 22 (FIG. 3B).

According to the disclosure, a single circuit trace of the plurality of circuit traces has at least three circuit trace sections, which are arranged on at least three different carrier surfaces. In the exemplary embodiment shown in FIGS. 1 to 5, the circuit traces each have four circuit trace sections, each of which is arranged on a different carrier surface. The individual circuit traces can also each have more circuit trace sections than carrier surfaces, so that several circuit trace sections of one circuit trace are arranged on each carrier surface.

In the exemplary embodiment shown, the electrical line 1 has a total of 36 circuit traces. Starting from the left, the first circuit trace sections 111-191 of the first nine circuit traces are arranged on the first carrier surface 21 shown in FIG. 2A. Furthermore, the second circuit trace sections 412-492 of the fourth nine circuit traces, the third circuit trace sections 313-393 of the third nine circuit traces and the fourth circuit trace sections 214-224 (the remaining fourth circuit trace sections are not shown) of the second nine circuit traces are arranged on the first carrier surface 21.

On the second carrier surface 22 shown in FIG. 2B, the first circuit trace sections 211-291 of the second nine circuit traces are arranged, starting from the left. Further, the second circuit trace sections 112-192 of the first nine circuit traces, the third circuit trace sections 413-493 of the fourth nine circuit traces and the fourth circuit trace sections 314-324

(the remaining fourth circuit trace sections are not shown) of the third nine circuit traces are arranged on the second carrier surface 22.

On the third carrier surface 23 shown in FIG. 2C, the first circuit trace sections 311-391 of the third nine circuit traces are arranged, starting from the left. Furthermore, the second circuit trace sections 212-292 of the second nine circuit traces, the third circuit trace sections 113-193 of the first nine circuit traces and the fourth circuit trace sections 414-424 (the remaining fourth circuit trace sections are not shown) of the fourth nine circuit traces are arranged on the third carrier surface 23.

On the fourth carrier surface 24 shown in FIG. 2D, the first circuit trace sections 411-491 of the fourth nine circuit traces are arranged, starting from the left. Furthermore, the second circuit trace sections 312-392 of the third nine circuit traces, the third circuit trace sections 213-293 of the second nine circuit traces and the fourth circuit trace sections 114-124 (the remaining fourth circuit trace sections are not shown) of the first nine circuit traces are arranged on the fourth carrier surface 24.

Depending on the length of the electrical line, further circuit trace sections of the respective conductor tracks can be connected, which are then also arranged on different carrier surfaces, as will be explained below. Several circuit trace sections of different circuit traces are thus arranged on a carrier surface, which run in parallel along the longitudinal extension direction L, at least in some areas.

Each circuit trace is thus composed of several circuit trace sections arranged on different carrier surfaces. An exemplary first circuit trace is composed of the circuit trace sections 111, 112, 113, 114. The first circuit trace section 111 is located on the first carrier surface 21 and ends at the point marked with the letter a. The second circuit trace section 112 is located on the second carrier surface 22, starting at the point marked with the letter a and ending at the point marked with the letter b. The third circuit trace section 113 is located on the third carrier surface 23, starting at the location marked with the letter b and ending at the location marked with the letter c. The fourth circuit trace section 114 is located on the fourth carrier surface 24, starting at the point marked with the letter c and continuing to the right in the longitudinal extension direction. Further circuit trace sections can then follow (not shown), which are again arranged alternately on the various carrier surfaces 21-24. The order of the carrier surfaces on which the circuit trace sections are arranged one after the other can also be different, as shown in FIGS. 2A-2D, and can also change in the longitudinal extension direction.

In the enlarged representation of a section of the first carrier surface 21 shown in FIG. 3A, it is clearly recognizable that a single circuit trace section arranged on a carrier surface, for example the first circuit trace section 131 of the third circuit trace, has several (in the present example three) section elements 131a, 131b, 131c, which are arranged offset to one another in the longitudinal extension direction L and in the transverse direction Q extending perpendicularly thereto. In each case, two section elements following one another in the longitudinal extension direction L are thus arranged offset to one another in the longitudinal extension direction and in the transverse direction perpendicular thereto and are connected to one another by a transverse connecting element. For example, the section elements 131a and 131b are connected to one another by a transverse connecting element 131ab, and the section elements 131b and 131c are connected to one another by a transverse connecting element 131bc.

In the exemplary embodiment shown, the third section element 131c is connected to a vertical connection 55 by means of an end connecting element 131y. This vertical connection 55 is used to change this circuit trace from the carrier surface 21 to the carrier surface 22, of which FIG. 3B shows an enlarged section. There, the second circuit trace section 132 of the third circuit trace is recognizable, which has several (in the present example, only the first four are recognizable in FIG. 3B) section elements 132a, 132b, 132c, 132d, which are arranged offset to one another in the longitudinal extension direction L and in the transverse direction Q extending perpendicularly thereto. Here, too, in each case two section elements following one another in the longitudinal extension direction L and arranged offset relative to one another are connected to one another by a transverse connecting element 132ab, 132bc, 132cd. Furthermore, the first section element 132a is connected to the vertical connection 55 by means of an end connecting element 132x. The carrier surface is thus changed in that the end connecting elements 131y and 132x are connected to one another by the vertical connection 55.

In FIGS. 2 and 3, it can be seen that the transverse connecting elements and the end connecting elements are arranged in groups parallel to each other in a carrier surface. It can also be seen that a section element of a circuit trace section is connected by an end connecting element having a vertical connection and that the vertical connection is arranged offset in the transverse direction to the respective section element.

The vertical connections are preferably arranged in a separate vertical connection region which extends in the longitudinal extension direction and substantially parallel to the circuit trace sections. In the exemplary embodiment shown, the vertical connection region has two vertical connection subregions 60, 61 which, viewed in the transverse direction, are arranged in opposite end regions outside the central region 70 in which the circuit trace sections run. The vertical connection region (or the vertical connection subregions 60, 61) are spaced apart from the circuit trace sections, and no section elements of circuit trace sections are arranged in the vertical connection region. Preferably, no section elements of circuit trace sections are arranged in all vertical connection regions of all carrier surfaces.

This ensures that the vertical connections can extend through one or prefer-ably all carrier layers and their carrier surfaces without colliding with circuit trace sections. The production of the vertical connections and the connections of circuit trace sections in the desired carrier layers is thus simplified and is particularly cost-effective.

The distance 62, 63 between a vertical connection region 60, 61 and directly adjacent section elements preferably corresponds to at least the distance 64 between two adjacent section elements. In other embodiments, however, the distance 62, 63 can also be smaller than the distance 64. Furthermore, the distance 62 between the vertical connection region 60, 61 and directly adjacent section elements is preferably equal to or preferably greater than the distance 64 between two adjacent section elements on at least one carrier surface. The arrangement of the vertical connections and the end connection elements, which electrically connect section elements having vertical connections, can thus be made more flexible, which in turn also simplifies manufacture and makes it more cost-effective.

Figure 16A:
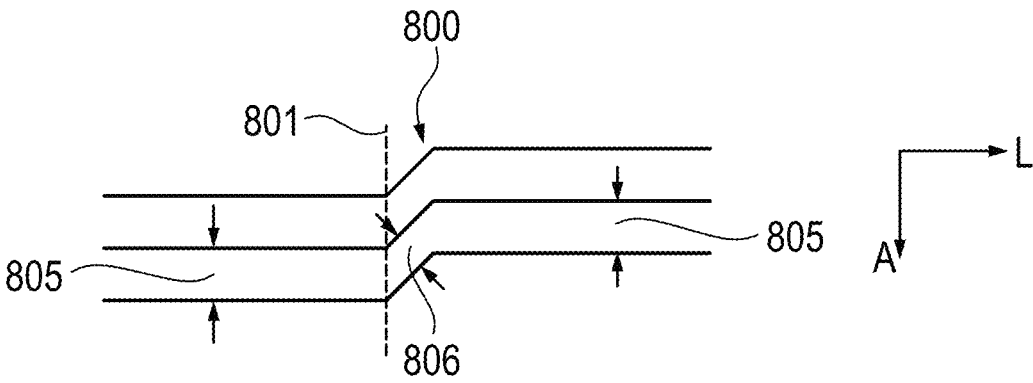
FIGS. 16A-16B shows two embodiments of different arrangements of transverse connecting elements.
Figure 16B:
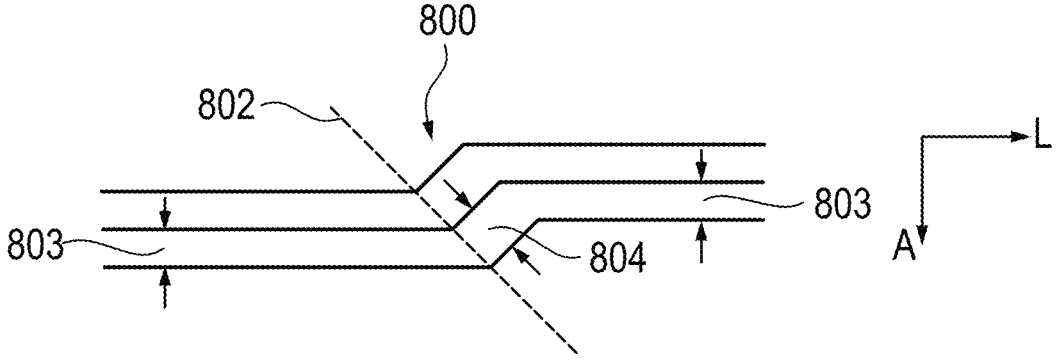

FIG. 16 shows two exemplary embodiments of the arrangement of transverse connecting elements. In the exemplary embodiments shown in FIGS. 1 to 3, as shown in simplified form in FIG. 16A, the transverse connecting elements 800 of adjacent circuit trace sections within a carrier surface, which in each case connect successive section elements of a circuit trace section to one another, are arranged along a line 801 which runs essentially perpendicular to the longitudinal extension direction L. Alternatively, however, the transverse connecting elements 800 of adjacent circuit trace sections can also be arranged along a line 802 which runs at an angle other than 90° to the longitudinal extension direction L. Such an exemplary embodiment is shown in FIG. 16B.

The embodiment shown in FIG. 16B has the advantage that the distance 803 between two adjacent circuit trace sections (before and after a transverse connecting element) can remain as large as the distance 804 between two adjacent transverse connecting elements. This in turn means that the individual circuit trace sections can be made thicker than in the embodiment shown in FIG. 16A, in which the distance 805 between two neighboring circuit trace sections (before and after a transverse connecting element) is greater than the distance 806 between two neighboring transverse connecting elements. The fill factor with circuit trace material, i.e. the utilization of the area available for the application of circuit traces on a printed circuit board, can thus be higher in the embodiment shown in FIG. 16B and can thus lead to a further reduction in manufacturing costs.

Figure 18:
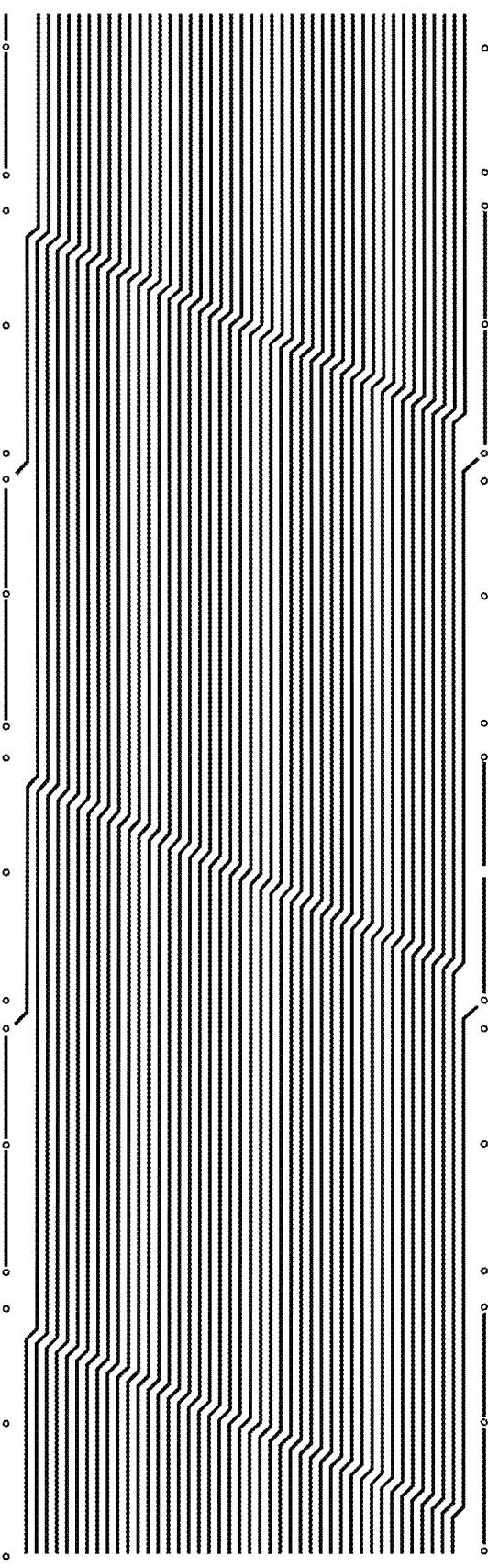
FIG. 18 shows an exemplary embodiment of the arrangement of a plurality of circuit trace sections in a carrier surface having a course of adjacent transverse connecting elements of the type shown in FIG. 16B.

FIG. 18 shows an exemplary embodiment of the arrangement of a plurality of circuit trace sections in a carrier surface, in which the adjacent transverse connecting elements run along a line which—similarly as shown in simplified form in FIG. 16B—runs transversely to the longitudinal extension direction L.

What is not shown in FIGS. 1 to 3 is that the beginnings and ends of the various circuit traces are electrically connected to each other and thus form a common electrical line through which a current can be conducted.

Figure 4:
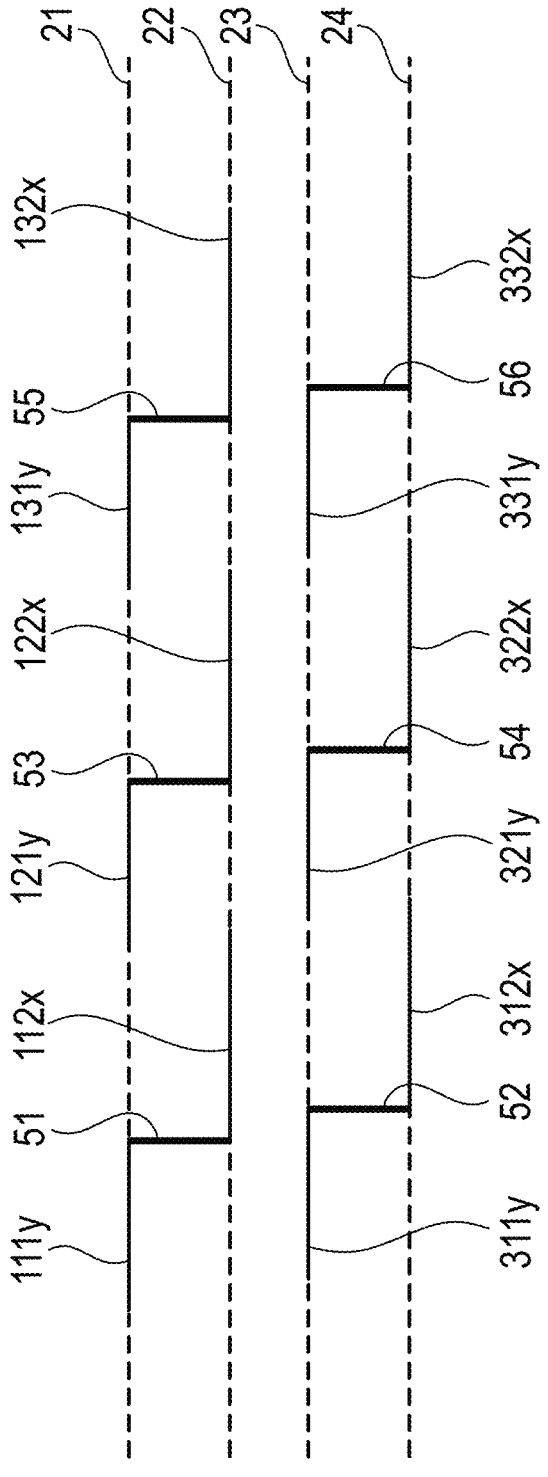
FIG. 4 shows a cross-section of an electrical line according to the disclosure in longitudinal extension direction.

FIG. 4 schematically shows a cross-section, extending in the longitudinal extension direction, through a section of an electrical line according to the disclosure in the area of the end connecting elements and the vertical connections. Several vertical connections 51-56 are recognizable, which are arranged at different points when viewed in the longitudinal direction. In each case, two circuit trace sections of a circuit trace are connected to one another by a vertical connection extending transversely to the carrier surfaces and through the carrier layers. Preferably, the vertical connections extend through all carrier layers and carrier surfaces. However, as shown in FIG. 4, they can also only extend through one carrier layer and two carrier surfaces.

The end connecting element 111y of the first circuit trace section 111 of the first circuit trace on the first carrier surface 21 and the end connecting element 112x of the second circuit trace section 112 on the second carrier surface 22 are connected to each other via the vertical connection 51. The end connecting element 311y of the first circuit trace section 311 of the first circuit trace on the third carrier surface 23 and the end connecting element 312x of the second circuit trace section 312 on the fourth carrier surface 24 are connected to each other via the vertical connection 52.

The end connecting element 121y of the first circuit trace section 121 of the second circuit trace on the first carrier surface 21 and the end connecting element 122x of the second circuit trace section 122 on the second carrier surface 22 are connected to each other via the vertical connection 53. The end connecting element 321y of the first circuit trace section 321 of the second circuit trace on the third carrier surface 23 and the end connecting element 322x of the second circuit trace section 322 on the fourth carrier surface 24 are connected to each other via the vertical connection 54.

The end connecting element 131y of the first circuit trace section 131 of the third circuit trace on the first carrier surface 21 and the end connecting element 132x of the second circuit trace section 132 on the second carrier surface 22 are connected to each other via the vertical connection 55. The end connecting element 331y of the first circuit trace section 331 of the third circuit trace on the third carrier surface 23 and the end connecting element 332x of the second circuit trace section 332 on the fourth carrier surface 24 are connected to each other via the vertical connection 56.

Figures 5A, 5B:
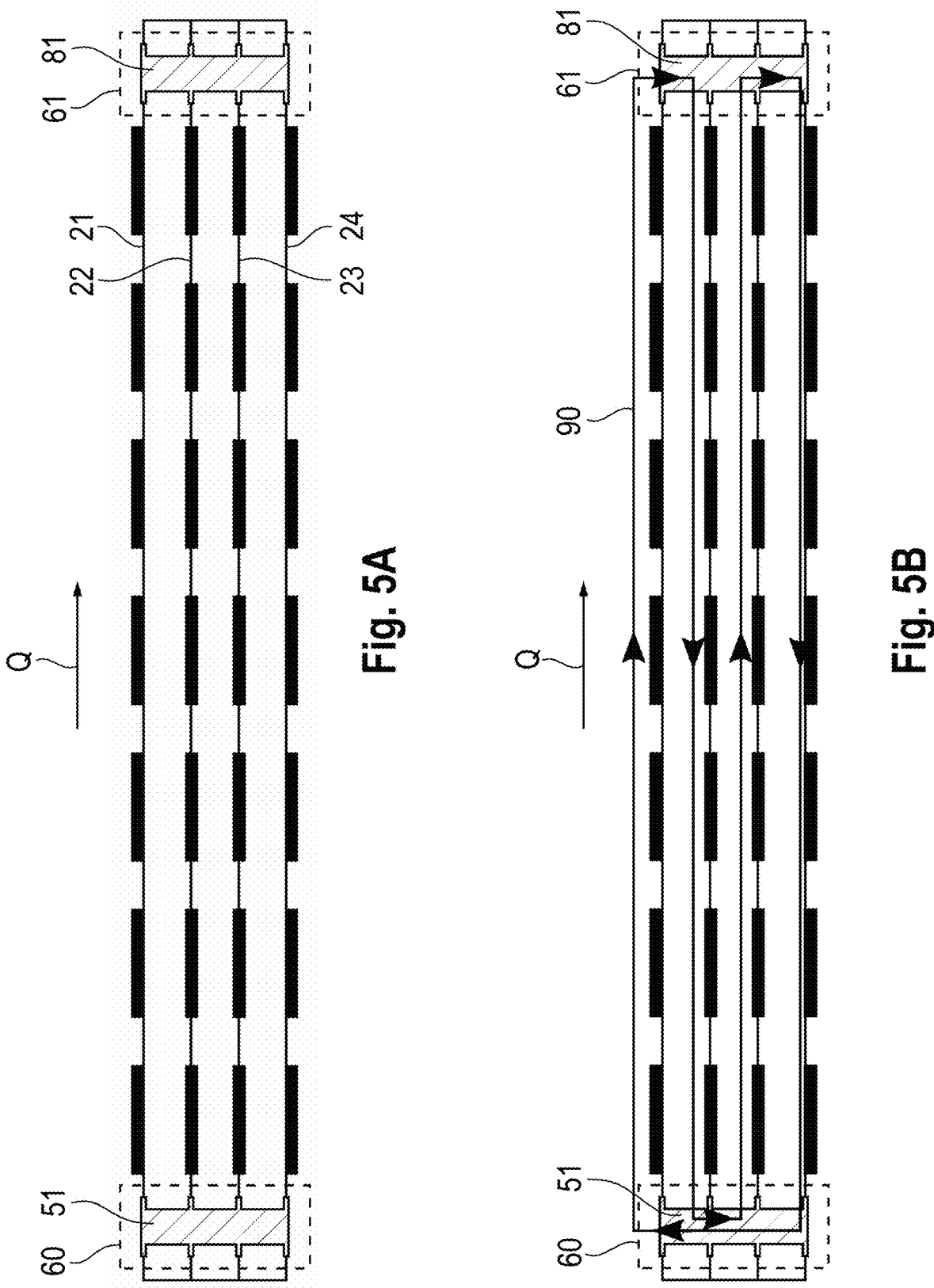
FIGS. 5A-5B shows a transverse cross-section of an electrical line according to the disclosure.

FIG. 5A shows a transverse cross-section through an electrical line 1 according to the disclosure. In this example, seven circuit traces are recognizable on each of the four carrier surfaces 21-24. Furthermore, a vertical connection 51, 81 is recognizable on each of the opposite sides, which are arranged in the opposite vertical connection sections 60 and 61 respectively.

FIG. 5B shows the cross-section shown in FIG. 5A, whereby the current path 90 is also shown via the individual carrier surfaces and through the vertical connections 51, 81. It can be seen that the current path 90 runs in different directions through the circuit trace sections on adjacent carrier surfaces. As a result, and due to the courses of the circuit trace sections on the carrier surfaces, the current path through the interwoven individual wires is virtually simulated in the case of a stranded wire.

FIG. 17 shows various perspective views of circuit trace sections and vertical connecting elements. FIG. 17A shows a perspective front view (in longitudinal extension direction L) of an electrical line 1 shown in FIGS. 1 to 5. FIG. 17B shows a perspective side view of this line 1. It can be seen in particular how the line sections are connected to the vertical connecting elements on the four different carrier surfaces 21-24. In the example shown, the vertical connecting elements (for example the vertical connecting element 51) are each formed by three vias 51a, 51b, 51c, which are arranged one behind the other. Alternatively, however, one or two or more vias can also be used. The vertical connecting elements each run completely through all carrier layers, which enables cost-effective production by means of a through-hole, even if they are not connected to circuit trace sections in all carrier surfaces, but only electrically connect two circuit trace sections to each other.

Furthermore, it can be seen how the section elements of the circuit trace sections (for example the section elements 131a, 131b of the circuit trace section 131) are arranged offset to one another within the various carrier surfaces 21-24 in the longitudinal extension direction, i.e. are arranged one behind the other in the longitudinal extension direction (preferably without overlapping in the longitudinal extension direction), and are arranged offset to one another in the transverse direction extending perpendicularly thereto, i.e. virtually change the "track" in the longitudinal extension direction. It can also be seen how in each case two section elements (for example the section elements 131a, 131b of the circuit trace section 131) that follow one another in the longitudinal extension direction and are arranged offset to one another are connected to one another by a transverse connecting element (for example the transverse connecting element 131ab).

Figure 17A:
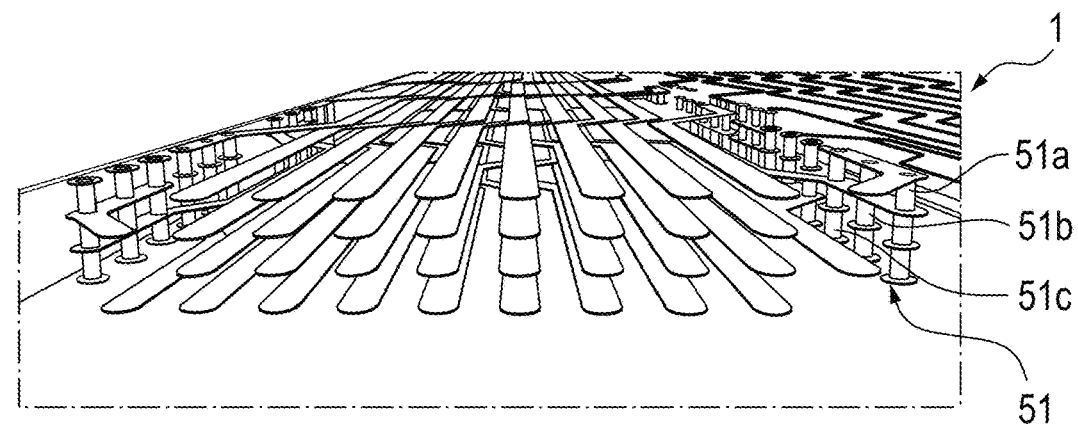
FIGS. 17A-17D shows different perspective views of circuit trace sections and vertical connection elements.
Figure 17B:
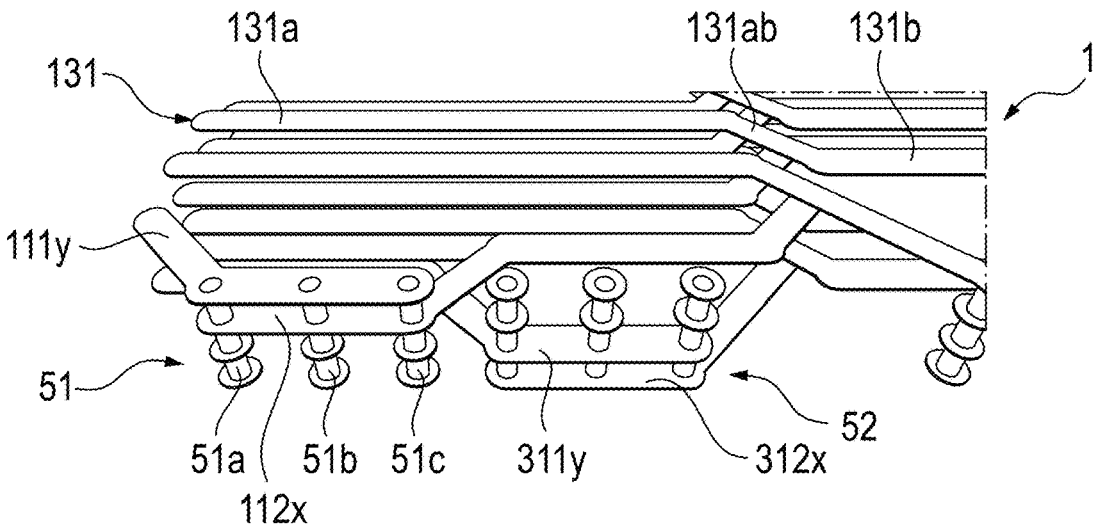
Figure 17C:
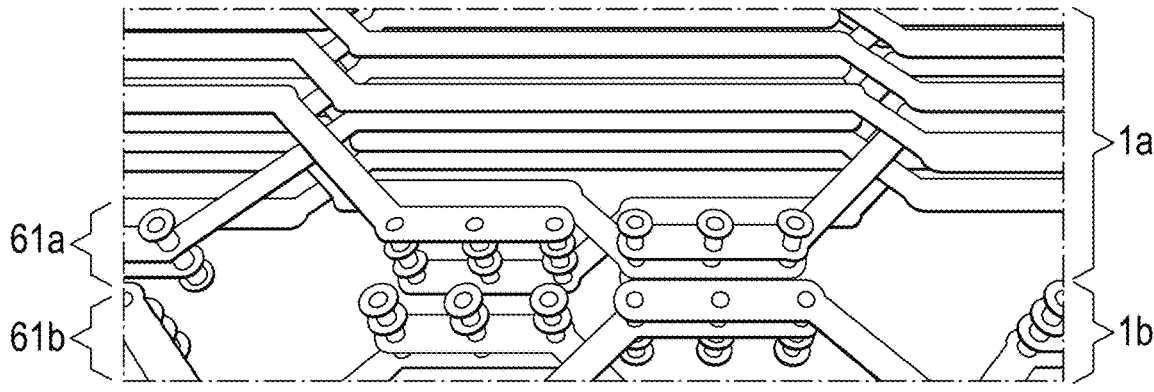
Figure 17D:
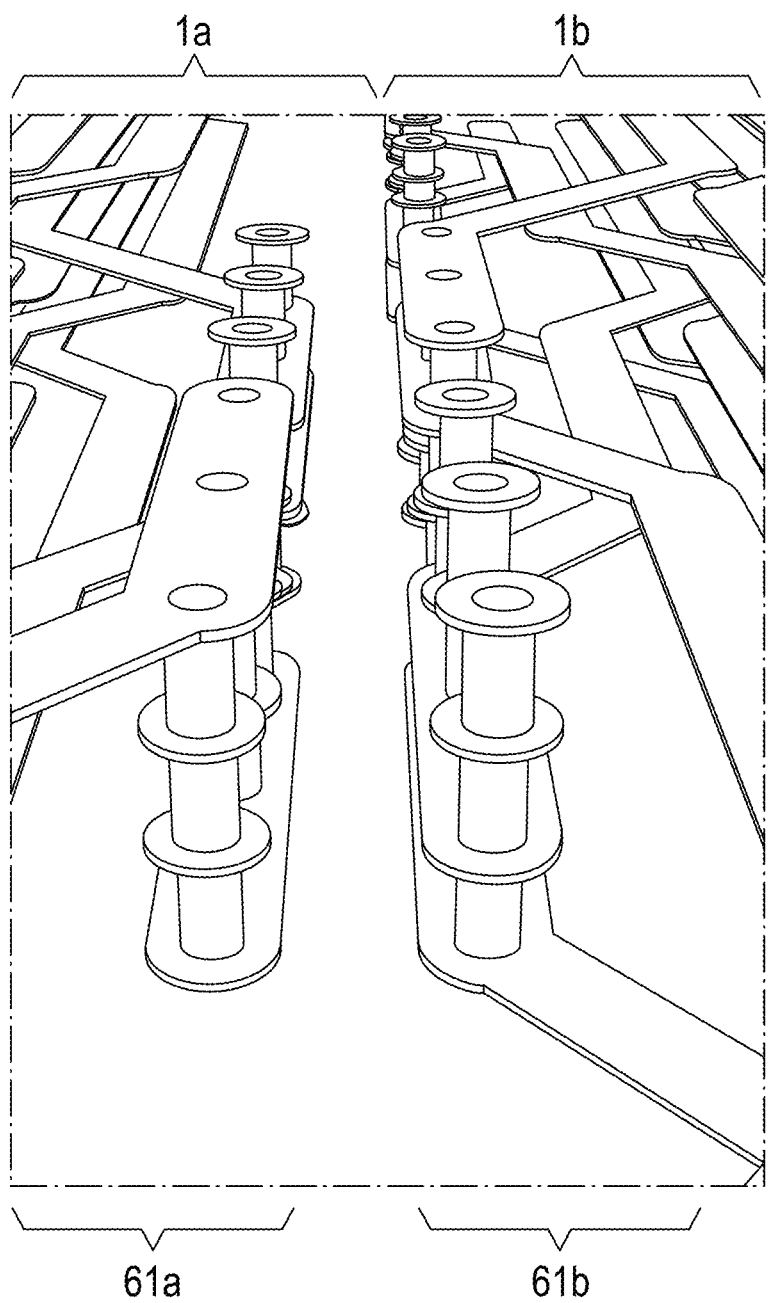

FIG. 17C shows a perspective front view (in longitudinal extension direction L) of parts of two adjacent conduits 1a, 1b of the type shown in FIGS. 1 to 5. FIG. 17D shows a perspective side view of these adjacent lines 1*a*, 1*b*. The adjacent vertical connection regions 61*a*, 61*b*, in which the vertical connections of the lines 1*a*, 1*b* are arranged, are particularly recognizable therein.

FIG. 6 shows various embodiments 100, 101, 102, 103 of how the electrical line 2 can be designed to change its direction, in this case by 90° in the longitudinal extension direction. These embodiments can be used, for example, to form a coil having the electrical line, as will be explained below. However, the electrical line 2 can also run differently; for example, the line sections can also change carrier surfaces in the curves, or the curves can be rounded or run differently than shown.

FIG. 7 shows cross-sections running in the longitudinal extension direction through various embodiments 110-115 of an electrical line 2 according to the disclosure having different types of vertical connections. Two carrier layers 20*a* and 20*b* (e.g. two PCB circuit boards) are stacked on top of each other, between which a separating layer 4, for example a dielectric, substrate, air, etc., is arranged. The surfaces of the carrier layers 20*a*, 20*b* each represent one of the carrier surfaces 21-24. The carrier layers 20*a*, 20*b* can, for example, be welded together or laminated to one another, and the separating layer 4 can consist of the same material as the carrier layers 20*a*, 20*b*. Preferably, an even number of carrier surfaces is used.

In the embodiments shown in FIGS. 7A and 7C, one (of several) circuit traces 121-124 is recognizable on each of the carrier surfaces 21-24. The two circuit traces 121 and 122 or 123 and 124 arranged on the carrier surfaces of the same carrier layer are each connected by a vertical connection 131 or 132 passing through the respective carrier layer, which can, for example, be designed as a through-hole via. An electrical interface connection 133 passing through the interface layer 4 is also provided between the carrier surfaces 22 and 23, for example in the form of a metallic connection (e.g. in the form of a solder point, for example made of tin). While in the embodiment 110 shown in FIG. 7A, the vertical connections 131, 132 and the interface connection 133 are arranged vertically one above the other, in the embodiment 112 shown in FIG. 7C, these are arranged offset with respect to each other in the longitudinal extension direction L. The offset arrangement has the advantage that the vertical joints 131, 132 cannot become saturated with the material of the vertical joints (e.g. tin), which could affect the quality of the vertical joints and could not ensure a consistent quality. Direct application of the material of the vertical connections directly over a vertical connection is therefore preferably avoided. Alternatively, the vertical joints can also be deliberately filled with filling material (so-called "plugging"). In the embodiment 112 shown in FIG. 7C, the circuit traces 122 and 123 are also each extended to the interface connection 133, which connects the circuit traces 122 and 123. The connection to the circuit traces 121 and 124 can be made, for example, via vias.

In each of the embodiments 111, 113 shown in FIGS. 7B and 7D, only the circuit traces 121 and 124 arranged on the outermost carrier surfaces 21, 24 are recognizable, which are connected to each other via the vertical connections 131, 132 and the interface connection 133. To connect the vertical connections 131, 132 with the interface connection 133, short connecting lines 134, 135 are arranged on the carrier surfaces 22, 23 in order to avoid the problem described above in connection with FIGS. 7A and 7C of the vertical connections being completely saturated with the material of the vertical connections and to manage without "plugging".

In the embodiments 114, 115 shown in FIGS. 7E and 7F, only the circuit traces 121, 122, 123 (FIG. 7E) or 122, 123, 124 (FIG. 7F) arranged on three carrier surfaces are recognizable in each case. In embodiment 114, only the vertical connection 131 is present, which connects the two circuit traces 121, 122 to each other. In embodiment 115, only the interface connection 133 is present, which connects the two circuit traces 122, 123 to each other. These embodiments offer the advantage that so-called blind and buried vias (i.e. contacts that do not pass through the entire printed circuit board) can be dispensed with in this conductor track constellation. This can reduce the costs for the overall assembly, as process steps in PCB production can be dispensed with. In embodiment 114 (FIG. 7E), a circuit trace 124 (see FIG. 7F) may also be provided, and in embodiment 115 (FIG. 7F), a circuit trace 121 (see FIG. 7E) may also be provided. In general, the structure shown in the various figures is not limited to three layers (carrier surfaces) and two carrier layers, but more than three layers (carrier surfaces) and/or more than two carrier layers can always be provided.

Figures 8A, 8B:
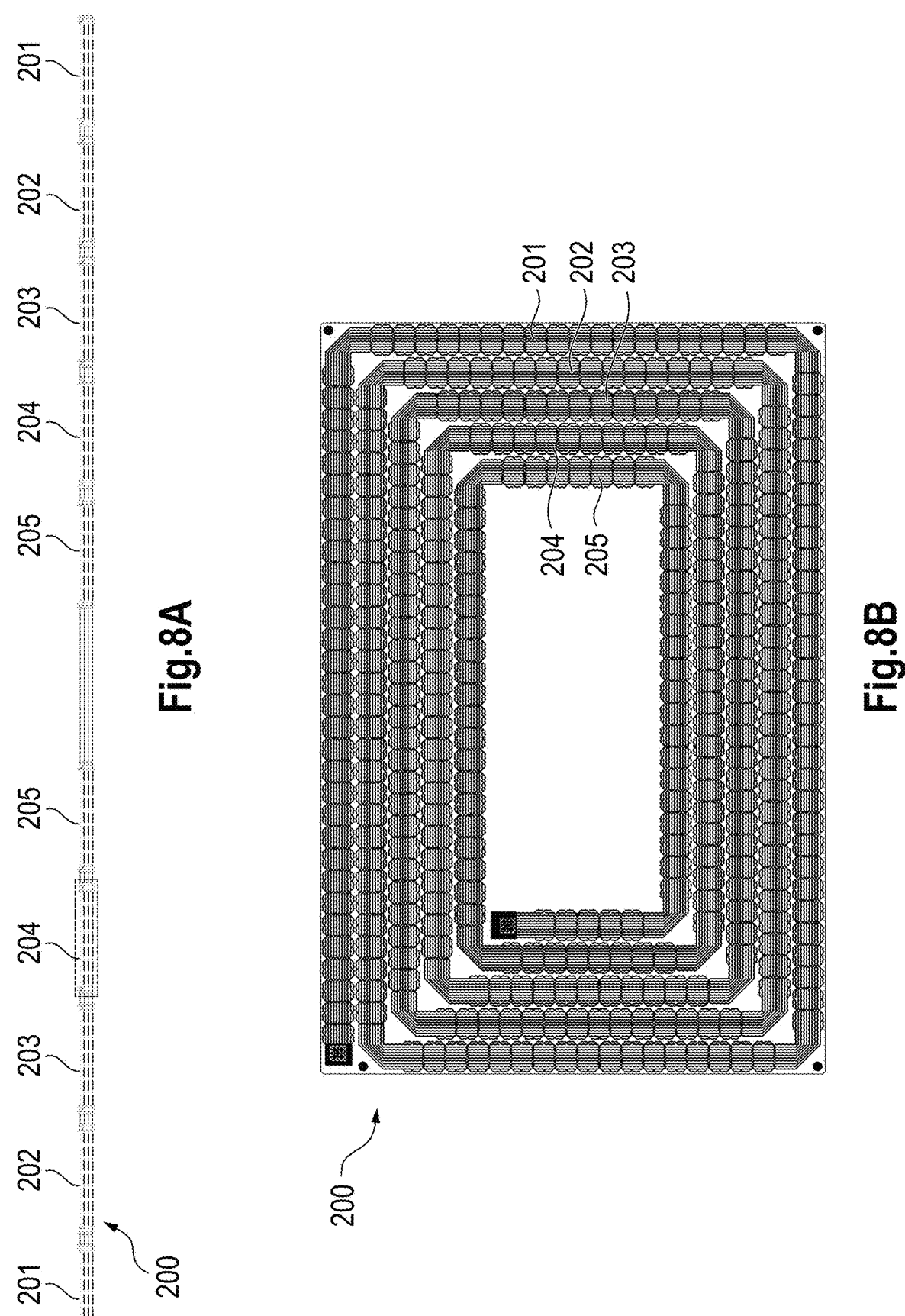
FIGS. 8A-8B shows a coil according to the disclosure in cross-section and in a plan view.

FIG. 8 shows a coil 200 according to the disclosure in cross-section (FIG. 8A) and in a plan view (FIG. 8B). The coil 200 may have one or more windings formed by means of the electrical line according to the disclosure. In the example shown, the coil 200 has five windings 201-205. Each of the windings 201-205 may be constructed in cross-section, for example, as shown in FIG. 4 or 5A, i.e., each winding is formed by a plurality of circuit traces arranged as described in the present application and forming the described electrical line.

In the exemplary embodiment shown, one end of the coil is arranged at the outer edge and the other end inside the coil. However, the windings can also be routed so that both ends are on the inside or outside. For example, two coils, as shown in FIG. 8, can be arranged separately on separate carrier layers (e.g. having four carrier surfaces each). Both coils (the separate carrier layers) are then arranged on top of each other and the two inner ends of the two coils or the two outer ends of the two coils are connected to each other.

Figure 9:
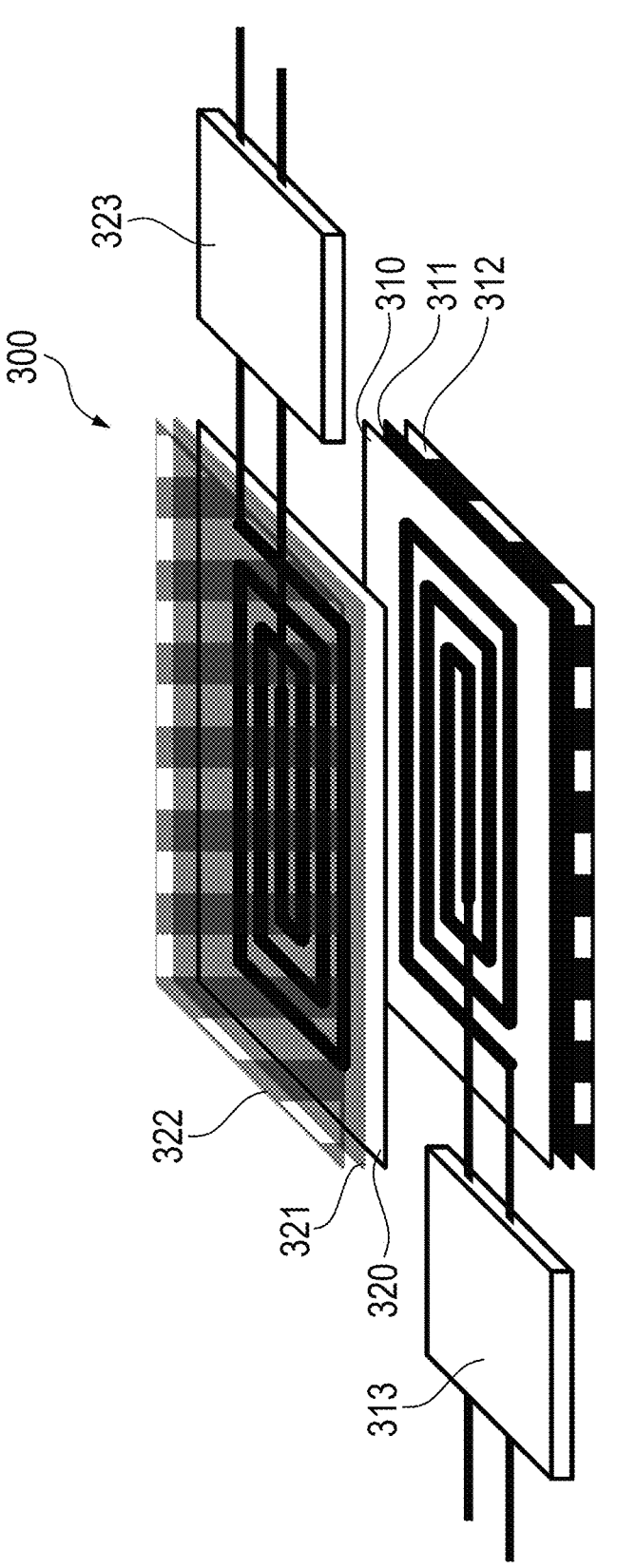
FIG. 9 shows a perspective view of an inductive power transfer device according to the disclosure.

FIG. 9 shows a perspective view of an inductive power transfer device 300 according to the disclosure, which has a primary coil 310 and a secondary coil 320. Both coils 310, 320 (or only one of the two coils 310, 320) can be constructed by means of the electrical line according to the disclosure and can be designed, for example, as shown in FIG. 8. Preferably, at least the primary coil 310 is constructed with the aid of the electrical line according to the disclosure, as this allows a particularly cost-effective and flat design to be achieved, which is advantageous for various applications of inductive power transfer devices.

In the exemplary embodiment shown, the power transfer device 300 has flux guiding means 311, 321 (e.g. platelets, a plate or layer of soft magnetic material, such as ferrite) and shielding means (e.g. platelets, a plate or layer of electrically conductive material, such as copper or aluminum) on the primary side and on the secondary side, respectively. The coils 310, 320 are each connected to an electronic means 312, 322, in particular for supplying the primary current and removing the secondary current. Furthermore, further electronic means 313, 323 can preferably be provided in each case, for example for control, power factor correction and current pick-up.

FIG. 10 shows a mobile device 400 having a coil 401 shown in FIG. 8 as a cross-section (FIG. 10A) and as a view from below (FIG. 10B). The coil 401 is preferably arranged on or in an outer surface of the mobile device 400 and serves as a secondary coil in order to be able to transfer energy to the mobile device 400 without contact, when the coil is opposite a primary coil of an inductive power transfer device shown in FIG. 9. The power transfer can occur in a stationary state or dynamically (i.e., during movement of the mobile device 400) when the mobile device 400 moves over one (or more) primary coils. For example, the primary coils may be integrated into ground plates that are laid out on an existing floor or may be built into or applied directly to the floor.

In general, the mobile device 400 can be any type of device that requires electrical power for any purpose. Exemplary applications are preferably found in vehicles of any kind, in particular driverless transport vehicles (also known as FTS or AGV), forklift trucks, cars, buses, trucks, but also in other systems, such as conveyor systems, robots, etc.

FIG. 11 shows a schematic structure of a PCB inductor (in this case a choke). A ferrite core 500 has been inserted into one or more PCB circuit boards 501, which contain the electrical windings of the choke, using through-hole mounting. Alternatively, the ferrite core 500 can also be constructed using individual plates or other core shapes. The PCB circuit boards form the described electrical line, whereby in this embodiment of the ferrite core 500 a layer change (i.e. a change of a circuit trace from one carrier surface to another carrier surface) preferably takes place outside the ferrite core. A plurality of circuit boards 501 may be stacked on top of each other, each circuit board 501 being formed by electrical lines as described herein. In a further application, coils of the present disclosure can also be used in transformers, in which the primary and secondary coils are constructed by means of the line according to the disclosure. The transformer cores (in E-shape) can, as shown in FIG. 11, be inserted through the respective coil, i.e. the two E-shaped cores each carry a coil of the transformer, which thus looks similar to the PCB inductance shown in FIG. 11.

FIG. 12 shows in cross-section two embodiments 600, 601 of an electrical machine, in particular an inductively electrically excited synchronous machine (iEESM), in which the electrical line according to the disclosure can be used. The electrical machines 600, 601 shown each have a machine rotor 602 and a machine stator 603, which are each constructed, for example, from laminated cores. To generate a magnetic field on the machine rotor 602, it is necessary to transfer electrical power to the machine rotor 602 or to an excitation winding of the machine rotor 602 of the electrically excited synchronous machine 600, 601. For this purpose, inductive power transfer devices 610, 620 may be provided in the present case. Such inductively electrically excited synchronous machines are described, for example, in DE102020207000 B4 and DE102020206998 B4, to which reference is made with regard to the general structure and mode of operation of such a machine.

Figure 12A:
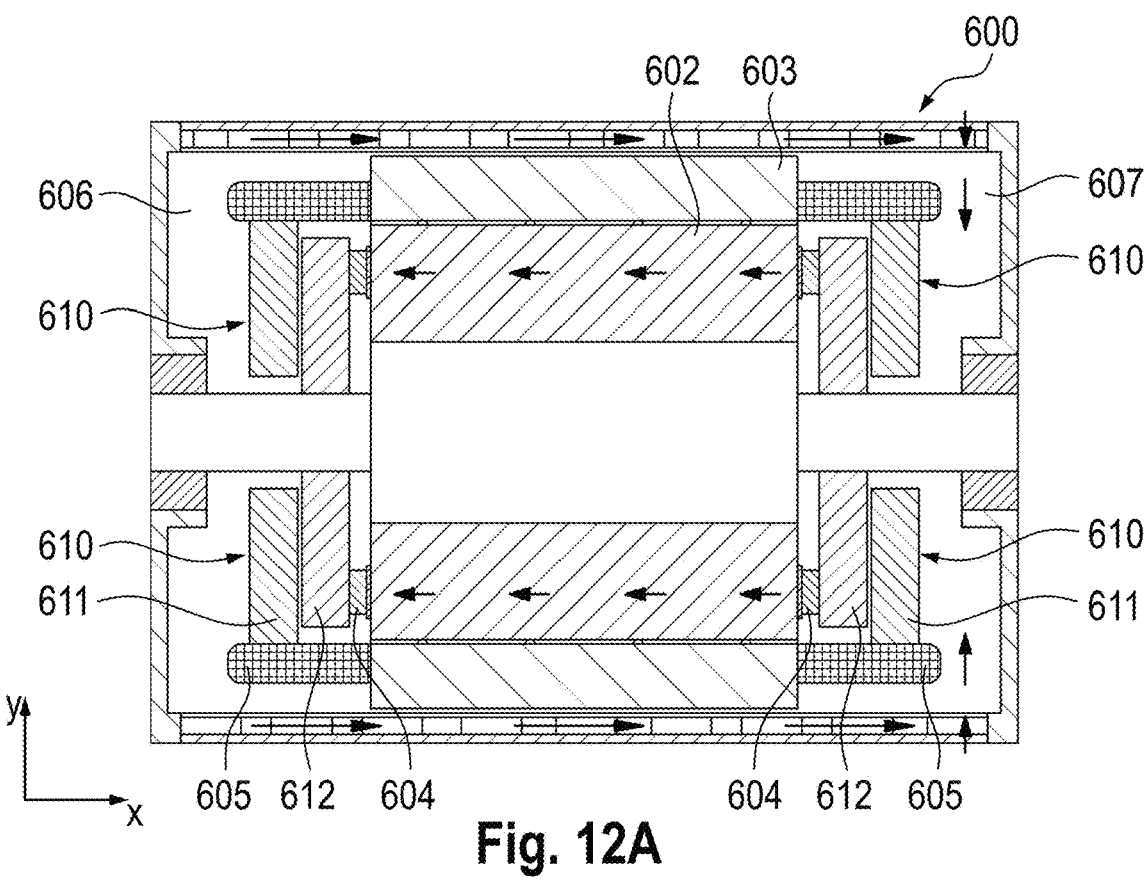
FIGS. 12A-12B shows a cross-sectional view of two embodiments of an electrical machine having a power transfer device according to the present disclosure.

FIG. 12A shows an electrical machine 600 having one (or more, in the present case two) inductive power transfer device(s) 610, each having a primary coil 611 and a secondary coil 612. The primary coils 611 are arranged on the machine stator 603, for example in the region of the winding head 605 of the machine stator 603. The secondary coils 612 are arranged on the machine rotor 602, for example in the region of the winding head 604 of the machine rotor 602. In the exemplary embodiment shown, the power transfer devices 610 are arranged axially at the two ends 606, 607 of the effective part of the electric machine 600.

Figure 12B:
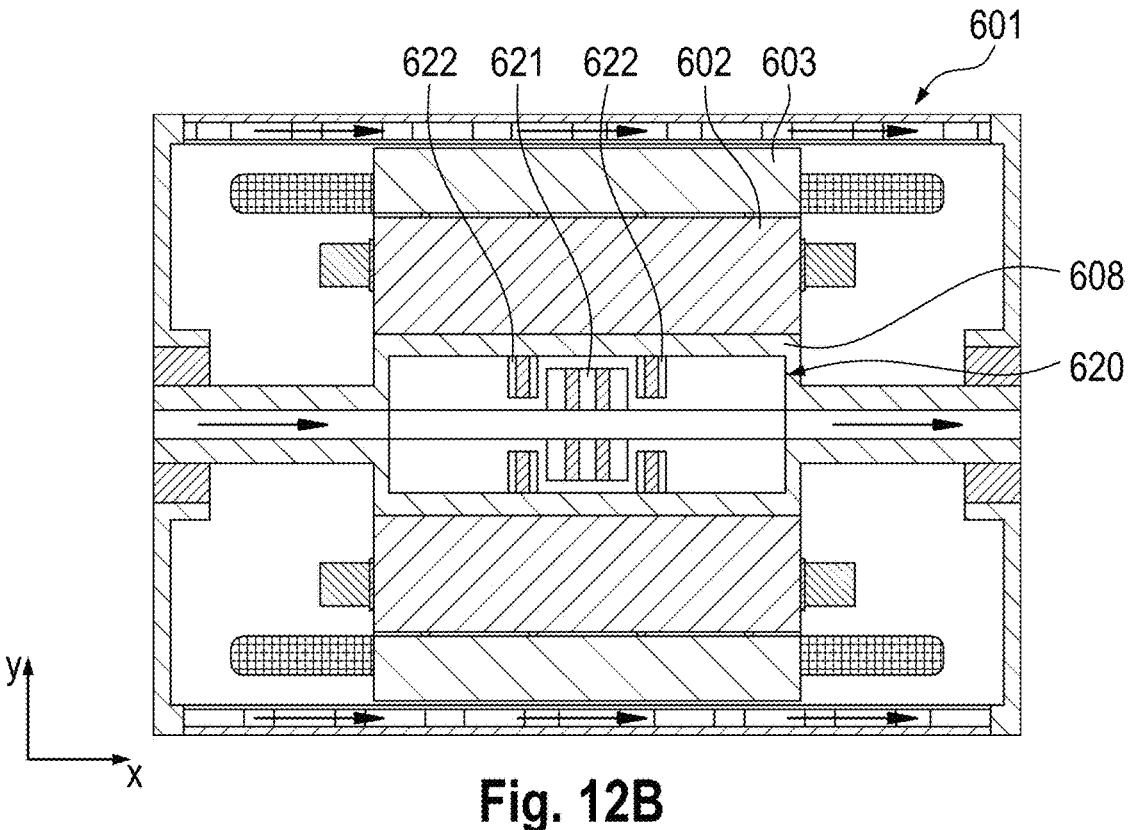

FIG. 12B shows an electrical machine 601 having an inductive power transfer device 620 in a hollow shaft 608 of the electrical machine 601. The primary coil 621 is arranged on a central shaft 609 within the hollow shaft 608, through which, for example, a coolant can be passed. The secondary coils 622 (two in the present case, but there may also be only one) are arranged on the machine rotor 602.

The energy transfer devices 610, 620 each serve to inductively transfer energy to the machine rotor 602 of the electric machine and may in general be constructed as described above, for example in connection with FIG. 9. In particular, the primary coils and/or the secondary coils (preferably both) are constructed using the electrical line according to the disclosure.

Figure 13:
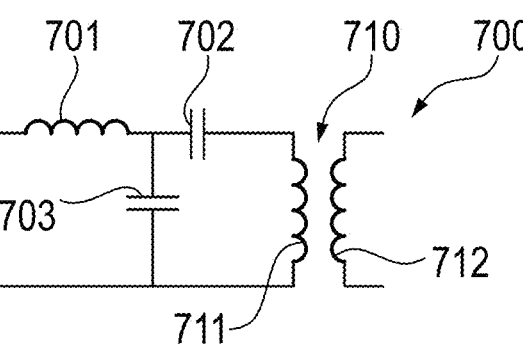
FIG. 13 shows an embodiment of a compensation circuit for use in a power transfer device according to the present disclosure.

FIG. 13 shows an embodiment of a compensation circuit 700, as can be used, for example, in the electronic devices 312, 322 shown in FIG. 9 for power factor correction in a magnetically coupled coil pair 710 comprising a primary coil 711 and a secondary coil 712. Preferably, such a compensation circuit 700 is used on the stationary side of an inductive power transfer device. However, it can also be used on both sides or only on the moving side. The compensation circuit 700 shown for power factor correction has a choke coil 701 and two capacitors 702, 703, the capacitor 702 being connected in series with the choke coil 701 and the primary coil 711 and the capacitor 703 being connected in parallel with the series connection of capacitor 702 and primary coil 711. The choke coil 701 and the primary coil 711 for energy transmission can be accommodated on a common printed circuit board. Furthermore, the choke coil 701 is preferably also constructed using the line according to the disclosure.

Figure 14A:
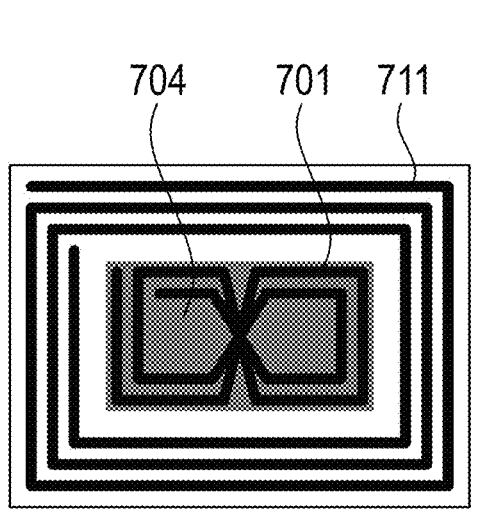
FIGS. 14A-14B shows a first embodiment of the arrangement of the choke coil of the compensation circuit with respect to the primary coil.
Figure 15A:
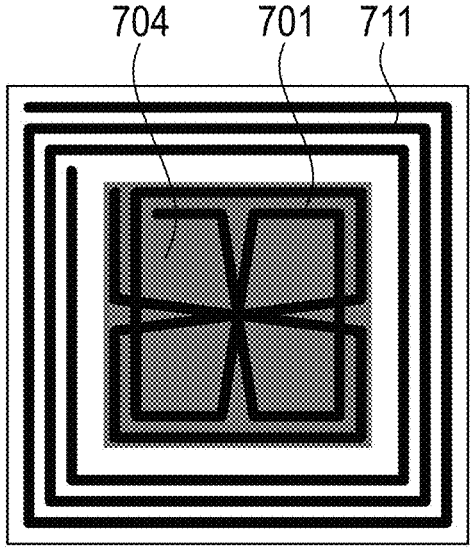
FIGS. 15A-15B shows a second embodiment of the arrangement of the choke coil of the compensation circuit with respect to the primary coil.
Figure 14B:
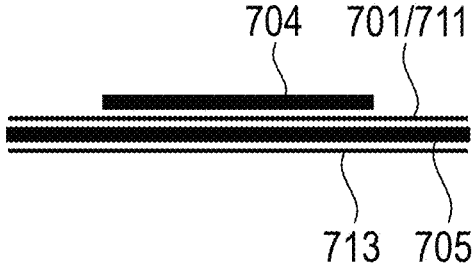
Figure 15B:
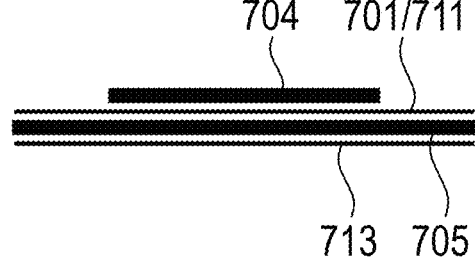

FIGS. 14 and 15 show two embodiments of the arrangement of the choke coil 701 and the primary coil 711, respectively as a top view (FIG. 14A and FIG. 15A) and as a cross-section (FIG. 14B and FIG. 15B). The same arrangement can also be selected if the compensation circuit is arranged on the secondary side, in which case the secondary coil 712 would be arranged where the primary coil 711 is arranged in FIGS. 14 and 15. As can be seen in FIGS. 14A and 15A, the choke coil 701 is arranged inside the primary coil 711. Preferably, both lie in one plane and are therefore not separately recognizable in the view of FIGS. 14B and 15B. The choke coil 701 is preferably magnetically decoupled from the primary coil 711. To improve the coil properties, the inner choke coil 701 can be provided with additional magnetically conductive material 704, for example having ferrite or nanocrystalline material. For example, a layer of magnetically conductive material (e.g. ferrite platelets) can be arranged below the choke coil 701 (i.e. between the choke coil 701 and the primary coil 711). The other layer structure can correspond to that of a conventional energy transfer coil, for example the primary coil 711. Furthermore, additional magnetically conductive material 705 (e.g. another ferrite layer) and an electrically conductive layer 713 for shielding can be arranged below the primary coil 711.

The present disclosure thus provides an electrical line with which a conventional stranded wire can be realized by means of circuit traces on a printed circuit board. With the aid of the electrical line according to the disclosure, various applications in the kHz range and at higher frequencies can operate with low losses, can be manufactured inexpensively and require little space, in particular compared to the use of conventional electrical lines such as conventional stranded wires. Such applications relate in particular to coils, an inductive power transfer device and an electrical device, such as a mobile electrical device having a coil or a power transfer device, a base plate with a coil or an electrical machine with a power transfer device.

In general, the present disclosure can be used wherever contactless electrical energy is to be transmitted and where slip rings or other means of energy transmission have been used up to now. This concerns, among other things, vehicles of all kinds, in particular electric vehicles such as electric cars, electric buses, electric trucks, industrial trucks, mobile vehicle robots, pallet trucks. Other applications can be found in kitchen appliances, hotplates, toothbrushes, robots, mobile devices, computers, tablets, power tools, etc.

The invention claimed is:

1. An electrical line having:

a conductor carrier having at least two substantially parallel carrier layers; and a plurality of circuit traces arranged on at least three different, substantially parallel carrier surfaces of the carrier layers, wherein:

a single circuit trace of the plurality of circuit traces has at least three circuit track sections arranged on at least three different carrier surfaces;

two respective circuit trace sections of a circuit trace are connected to one another by vertical connections extending transversely to the carrier surfaces and through at least one carrier layer;

a plurality of circuit trace sections of different circuit traces is arranged on a carrier surface, which run parallel to one another at least in some areas and which run along a longitudinal extension direction at least in some areas; and a circuit trace section arranged on a carrier surface has a plurality of section elements, wherein two respective section elements following one another in the longitudinal extension direction are arranged offset relative to one another both in the longitudinal extension direction and in the transverse direction extending perpendicularly thereto and are connected to one another by a transverse connecting element, wherein the vertical connections are arranged in at least one vertical connection region which is spaced apart from the circuit trace sections and/or in which no section elements of circuit trace sections are arranged, and wherein the vertical connections each have a plurality of connecting elements and/or are each configured as a plurality of vias or through-contacts.

2. The electrical line according to claim 1, wherein a section element of a circuit trace section is connected to a vertical connection by an end connecting element, the vertical connection being arranged offset in transverse direction with respect to the said section element.

3. The electrical line according to claim 2, wherein the transverse connecting elements and the end connecting elements are arranged in groups parallel to one another in a carrier surface.

4. The electrical line according to claim 1, wherein the vertical connections are arranged in at least one vertical connection region which extends in the longitudinal direction and/or substantially parallel to the circuit trace sections.

5. The electrical line according to claim 1, wherein no section elements of circuit trace sections are arranged in all vertical connection regions of all carrier surfaces.

6. The electrical line according to claim 1, wherein the distance between a vertical connection region and directly adjacent section elements corresponds at least to the distance between two adjacent section elements.

7. The electrical line according to claim 1, wherein, on at least one carrier surface, the distance between the vertical connection region and directly adjacent section elements is equal to or greater than the distance between two adjacent section elements.

8. The electrical line according to claim 4, wherein the vertical connection region comprises two vertical connection subsections which, viewed in the transverse direction, are arranged in opposite end regions outside the central region in which the circuit trace sections extend.

9. The electrical line according to claim 1, wherein the vertical connections extend through several carrier layers, in particular through all carrier layers.

10. The electrical line according to claim 1, wherein the vertical connections each have a plurality of connecting elements extending in parallel.

11. The electrical line according to claim 1, wherein, on a first carrier surface, the section elements of a circuit trace section are offset relative to one another in a first direction in the transverse direction, as viewed in the longitudinal extension direction, and in a second carrier surface, the section elements of a circuit trace section are offset relative to one another in a second direction in the transverse direction, as viewed in the longitudinal extension direction, which second direction runs in the opposite direction to the first direction.

12. The electrical line according to claim 1, having two or more conductor carriers which are arranged one above the other and whose vertical connections are electrically connected to one another at opposite carrier surfaces of two conductor carriers.

13. A coil having at least one helically arranged winding of an electrical line according to claim 1.

14. An inductive power transfer device having a primary coil unit and a secondary coil unit, wherein the primary coil unit and/or the secondary coil unit comprises the coil according to claim 13.

15. An electrical device having a coil according to claim 13.

16. The electrical device according to claim 15, wherein the electrical device is a mobile device or ground plate having the coil according to claim 13.

17. The electrical device according to claim 15, wherein the electrical device is an electrical machine having the inductive power transfer device according to claim 14.

18. An electrical device having the inductive power transfer device according to claim 14.

* * * * *